US009335558B2

(12) United States Patent
Yasui et al.

(10) Patent No.: US 9,335,558 B2
(45) Date of Patent: May 10, 2016

(54) ILLUMINATION DEVICE AND DISPLAY DEVICE

(75) Inventors: Toshifumi Yasui, Kanagawa (JP); Hiroshi Isobe, Kanagawa (JP); Kazuyuki Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 599 days.

(21) Appl. No.: 13/543,792

(22) Filed: Jul. 7, 2012

(65) Prior Publication Data

US 2013/0016136 A1 Jan. 17, 2013

(30) Foreign Application Priority Data

Jul. 13, 2011 (JP) ................................. 2011-154592
Dec. 14, 2011 (JP) ................................. 2011-273555

(51) Int. Cl.
*G09G 5/10* (2006.01)
*G02B 27/48* (2006.01)
*G03B 21/20* (2006.01)
*G03B 33/08* (2006.01)
*H04N 9/31* (2006.01)

(52) U.S. Cl.
CPC .............. *G02B 27/48* (2013.01); *G03B 21/208* (2013.01); *G03B 21/2033* (2013.01); *G03B 33/08* (2013.01); *H04N 9/3129* (2013.01); *H04N 9/3155* (2013.01)

(58) Field of Classification Search
CPC .. G02B 27/48; G03B 21/2033; G03B 21/208; G03B 33/08; H04N 9/3129; H04N 9/3155
USPC ............................. 345/690; 359/629; 362/231
See application file for complete search history.

(56) References Cited

U.S. PATENT DOCUMENTS

| 5,313,479 A * | 5/1994 | Florence .......................... 372/26 |
| 2008/0165401 A1* | 7/2008 | Kasazumi ...................... 359/196 |
| 2010/0053565 A1* | 3/2010 | Mizushima et al. ............ 353/38 |
| 2010/0171927 A1* | 7/2010 | Kitano et al. .................... 353/20 |
| 2012/0044280 A1* | 2/2012 | Nakayama et al. ........... 345/690 |
| 2012/0092972 A1* | 4/2012 | Taratorin et al. ........... 369/13.29 |

FOREIGN PATENT DOCUMENTS

| JP | 55-065940 | 5/1980 |
| JP | 06-208089 | 7/1994 |

* cited by examiner

*Primary Examiner* — Amare Mengistu
*Assistant Examiner* — Stacy Khoo
(74) *Attorney, Agent, or Firm* — Hazuki International, LLC

(57) ABSTRACT

An illumination device including a light source section including a laser light source, and allowing a laser light beam emitted from the laser light source to be output intermittently at a predetermined frequency; an optical element through which the laser light beam passes; and a driver section changing a coherency of the laser light beam by driving the optical element at a predetermined drive frequency. Expressions (1) $|2 \times f2 - n1 \times f1| \geq 20$ or (2) $|2 \times f2 - n2 \times f1| \leq 3$, (3) $f2 \geq 20$ or (4) $f2 \leq 3$, and (5) $|f2 - n1 \times f1| \geq 20$ or (6) $|f2 - n3 \times f1| \leq 3$ are satisfied, where f1 denotes the predetermined frequency in Hz, f2 denotes a variation frequency of luminance in illumination light output from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

20 Claims, 23 Drawing Sheets

FIG. 12A

· SUM-FREQUENCY

|  |  |  | FIRST CONSTITUENT FREQUENCY | | SECOND CONSTITUENT FREQUENCY |
|---|---|---|---|---|---|
|  |  |  | No. 1 | No. 2 |  |
|  |  |  | $f_0$ | $(2X-1)f_1$ | $f_0 \pm (2X-1)f_1$ |
| FIRST CONSTITUENT FREQUENCY | No. 1 | $f_0$ | — | $f_0 + (2X-1)f_1$ | $2f_0 \pm (2X-1)f_1$ |
|  | No. 2 | $(2X-1)f_1$ | — | $2Xf_1$ | $f_0 \pm 2X'f_1$ |
| SECOND CONSTITUENT FREQUENCY | | $f_0 \pm (2X-1)f_1$ | — | — | $2f_0 \pm 2X'f_1$ |

FIG. 12B

· DIFFERENCE-FREQUENCY

|  |  |  | FIRST CONSTITUENT FREQUENCY | | SECOND CONSTITUENT FREQUENCY |
|---|---|---|---|---|---|
|  |  |  | No. 1 | No. 2 |  |
|  |  |  | $f_0$ | $(2X-1)f_1$ | $f_0 \pm (2X-1)f_1$ |
| FIRST CONSTITUENT FREQUENCY | No. 1 | $f_0$ | — | $f_0 - (2X-1)f_1$ | $\pm (2X-1)f_1$ |
|  | No. 2 | $(2X-1)f_1$ | — | $2X'f_1$ | $f_0 \pm 2X'f_1$ |
| SECOND CONSTITUENT FREQUENCY | | $f_0 \pm (2X-1)f_1$ | — | — | $\pm 2X'f_1$ |

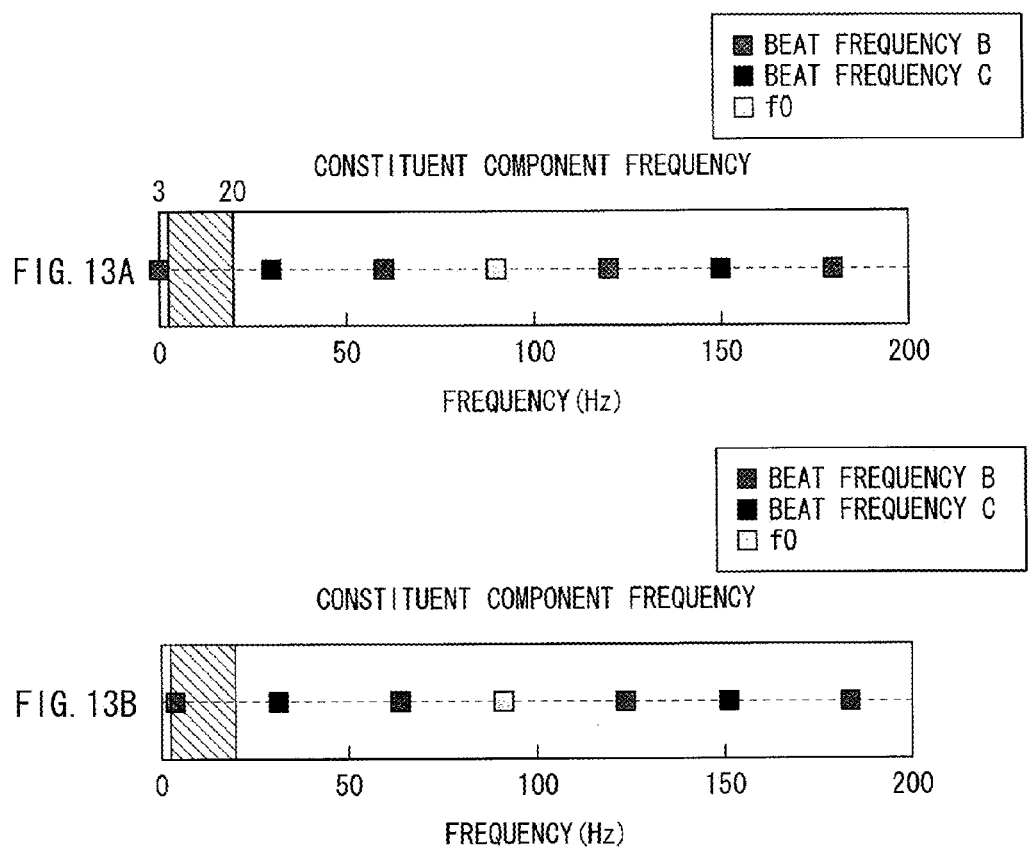

FIG. 18A

- SUM-FREQUENCY

|  |  | | FIRST CONSTITUENT FREQUENCY | | SECOND CONSTITUENT FREQUENCY |
|---|---|---|---|---|---|
|  |  | | No. 1 | No. 2 |  |
|  |  | | $f_0$ | $Xf_1$ | $f_0 \pm Xf_1$ |
| FIRST CONSTITUENT FREQUENCY | No. 1 | $f_0$ | — | $f_0 + Xf_1$ | $2f_0 \pm Xf_1$ |
|  | No. 2 | $Xf_1$ | — | $X'f_1$ | $f_0 \pm X'f_1$ |
| SECOND CONSTITUENT FREQUENCY | | $f_0 \pm Xf_1$ | — | — | $2f_0 \pm X'f_1$ |

FIG. 18B

- DIFFERENCE-FREQUENCY

|  |  | | FIRST CONSTITUENT FREQUENCY | | SECOND CONSTITUENT FREQUENCY |
|---|---|---|---|---|---|
|  |  | | No. 1 | No. 2 |  |
|  |  | | $f_0$ | $Xf_1$ | $f_0 \pm Xf_1$ |
| FIRST CONSTITUENT FREQUENCY | No. 1 | $f_0$ | — | $f_0 - Xf_1$ | $\pm Xf_1$ |
|  | No. 2 | $Xf_1$ | — | $X'f_1$ | $f_0 \pm X'f_1$ |
| SECOND CONSTITUENT FREQUENCY | | $f_0 \pm Xf_1$ | — | — | $\pm X'f_1$ |

ILLUMINATION DEVICE AND DISPLAY DEVICE

BACKGROUND

The present disclosure relates to an illumination device that emits light including laser light, and a display device that displays an image by using such an illumination device.

Typically, a projector (or a projection display device) includes an optical module as a main component, and this optical module is constituted by an illumination optical system (or an illumination device) including a light source, and a projection optical system (or a profile optical system) including light modulation elements. In the field of such projectors, recently, compact (or palm sized), lightweight portable projectors called "micro projectors" have been increasingly dispersed. Typically, such a micro projector mainly includes a light emitting diode (LED), as a light source, in an illumination device.

On the other hand, lately, there is a growing interest in lasers for new light sources in illumination devices. For instance, projectors equipped with a gas laser have been known, as projectors using laser lights of three primary colors, such as red (R), green (G), and blue (B). Examples of a projector using a laser as a light source, as described above, are proposed by Japanese Unexamined Patent Application Publications Nos. S55-65940 and H06-208089. By using a laser as a light source, projectors achieve a wide range of color reproduction and low power consumption.

SUMMARY

Generally, when coherent light, such as laser light, is irradiated on a diffusing surface, spotty patterns may be observed thereon, as opposed to using other types of light. These patterns are called "speckle patterns". When the light is irradiated on the diffusing surface, it is scattered randomly at various locations thereof, and the scattered lights of random phases, which are in accordance with the slightly uneven surface, interfere with one another. As a result, the speckle patterns are generated.

If a projector having a laser in a light source is used, the above speckle patterns (or interference patterns) are overlaid over an image displayed on a screen. These patterns may be recognized by human eyes as intense random noises, thus leading to the lowering of the display quality.

Accordingly, in order to reduce the generation of the speckle patterns (or speckle noises) generated by a projector having a laser in a light source, a technique has been proposed for slightly vibrating a predetermined optical element, etc. in the projector through which the laser light passes. Generally, it is difficult for human eyes and brains to recognize flickers on an image in a period of about 20 ms to 50 ms. Thus, human eyes integrate the variation in an image during such a short period, and recognize this average as the image. Therefore, the above-mentioned technique aims to average the speckle noises so as not to be recognized by human eyes, by overlaying a lot of independent speckle patterns on a screen during the short period. This may reduce the generation of the interference patterns generated due to laser light.

As described above, when an optical element slightly vibrates, the generation of the interference patterns is reduced. However, the luminance of the illumination light is prone to being non-uniform prominently. This leads to the lowering of the display image quality. The illumination non-uniformity of the illumination light may be generated due to not only the slight vibration of the optical element, but also the driving of the optical element by means of another technique.

There is a need for an illumination device and a display device which suppress the illumination non-uniformity while reducing the generation of the interference patterns.

An illumination device according to an embodiment of the present disclosure includes: a light source section including a laser light source, and allowing a laser light beam emitted from the laser light source to be output intermittently at a predetermined frequency; an optical element through which the laser light beam output intermittently from the light source section passes; and a driver section changing a coherency of the laser light beam by driving the optical element at a predetermined drive frequency, wherein the following expression (1) or (2), expression (3) or (4), and expression (5) or (6) are satisfied:

$$|2 \times f2 - n1 \times f1| \geq 20 \tag{1}$$

$$|2 \times f2 - n2 \times f1| \leq 3 \tag{2}$$

$$f2 \geq 20 \tag{3}$$

$$f2 \leq 3 \tag{4}$$

$$|f2 - n1 \times f1| \geq 20 \tag{5}$$

$$|f2 - n3 \times f1| \leq 3 \tag{6}$$

where f1 denotes the predetermined frequency in Hz, f2 denotes a variation frequency of luminance in illumination light output from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

Typically, the above optical element may be driven in form of a sinusoidal wave (for example, see Part (B) of FIG. 10). In this case, the above "variation frequency (f2) of the luminance" may correspond to a frequency of the sinusoidal wave. However, a drive waveform of the optical element is not limited to the sinusoidal wave. Alternatively, the "variation frequency (f2) of the luminance" may be a primary frequency having the maximum amplitude component. However, if such a primary frequency is not present, (for example, if white noise is considered as in modification example 7 (described hereinafter), the "variation frequency (f2) of the luminance" may be an arbitrary frequency (or any of all frequencies). Furthermore, typically, the laser light source may emit the laser light beam intermittently in form of a rectangular pulse (for example, see Part (A) of FIG. 10). In general, this rectangular pulse may contain harmonic components of the fundamental frequency. This may mean that the above "frequency (f1)" may correspond to a fundamental frequency of the drive pulse itself (for example, rectangular pulse). In one embodiment of the present disclosure, the "coherency" of the laser light beam may include one or more of a position, an angle, a polarization, and a phase thereof.

A display device according to an embodiment of the present disclosure is provided with an illumination device emitting illumination light and a light modulation element modulating the illumination light based on an image signal. The illumination device includes: a light source section including a laser light source, and allowing a laser light beam emitted from the laser light source to be outputted intermittently at a predetermined frequency; an optical element through which the laser light beam outputted intermittently from the light source section passes; and a driver section changing a coherency of the laser light beam by driving the optical element at a predetermined drive frequency, wherein the following expression (1) or (2), expression (3) or (4), and expression (5) or (6) are satisfied:

$$|2 \times f2 - n1 \times f1| \geq 20 \quad (1)$$

$$|2 \times f2 - n2 \times f1| \leq 3 \quad (2)$$

$$f2 \geq 20 \quad (3)$$

$$f2 \leq 3 \quad (4)$$

$$|f2 - n1 \times f1| \geq 20 \quad (5)$$

$$|f2 - n3 \times f1| \leq 3 \quad (6)$$

where f1 denotes the frequency in Hz, f2 denotes a variation frequency of luminance in illumination light outputted from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

Both the illumination device and the display device according to respective embodiments of the present disclosure drive the optical element through which the laser light beam emitted from the laser light source passes, thereby changing the coherency of the laser light beam. This reduces the generation of an interference pattern generated due to the laser light beam. Moreover, both the illumination device and the display device satisfy the expressions (1) or (2), (3) or (4), and (5) or (6). This obscures a beat phenomenon occurring in relation to a combination of the frequency of the laser light beam and the variation frequency (vibration frequency) of luminance in the illumination light which is generated by the driving of the optical element.

As described above, both the illumination device and the display device according to respective embodiments of the present disclosure drive the optical element through which the laser light beam emitted from the laser light source passes, thereby changing the coherency of the laser light beam, as well as satisfy the expressions (1) or (2), (3) or (4), and (5) or (6). This makes it possible to reduce the generation of the interference pattern generated due to the laser light beam, as well as obscure the beat phenomenon occurring in relation to the combination of the frequency of the laser beam and the variation frequency (vibration frequency) of the luminance in the illumination light. Consequently, it is possible for the illumination device and the display device according to respective embodiments of the present disclosure to suppress the luminance non-uniformity while reducing the generation of the interference patterns, thus improving the display image quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 1:
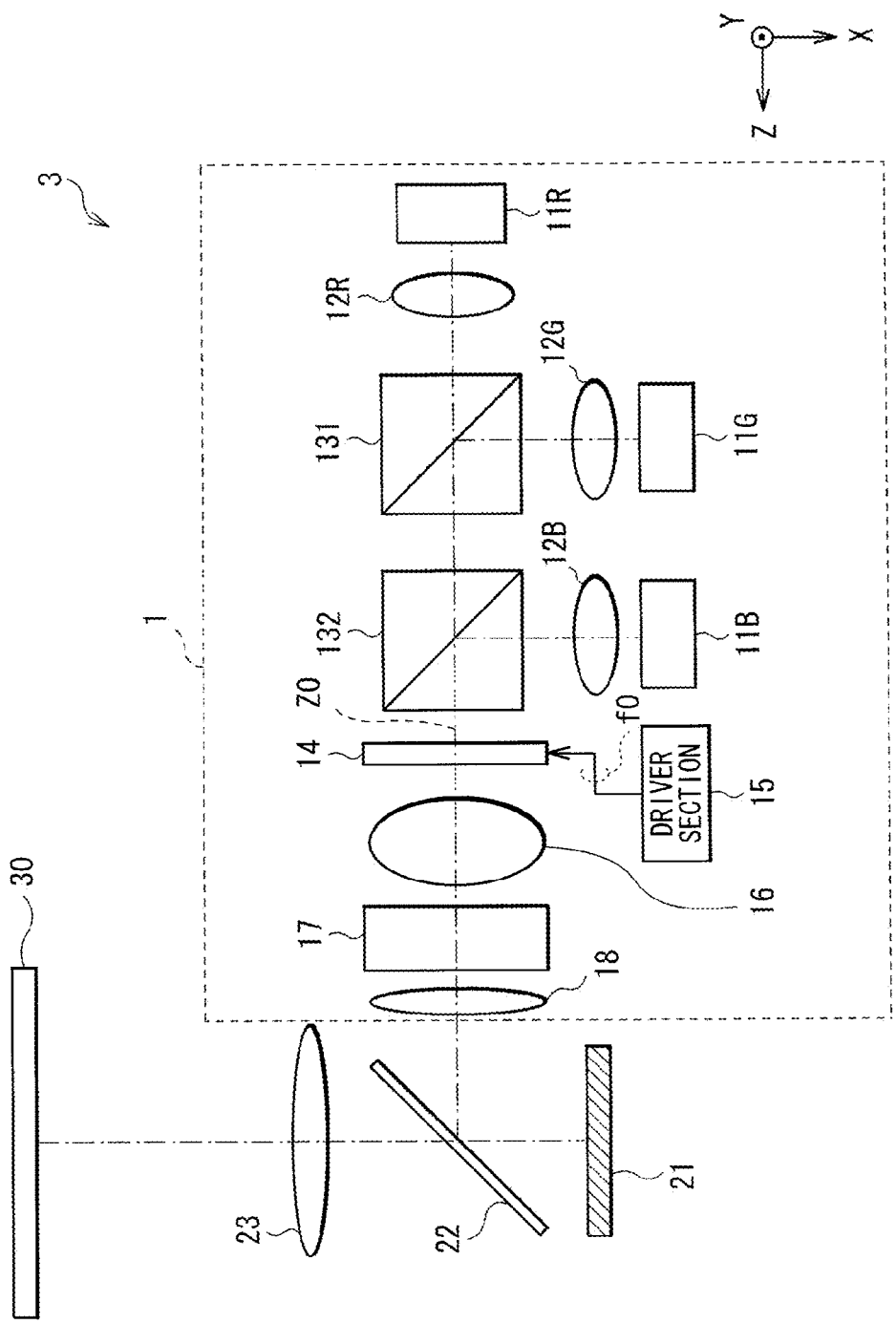
FIG. 1 is a view depicting a whole structure of a display device according to an embodiment of the present disclosure.
Figure 2:
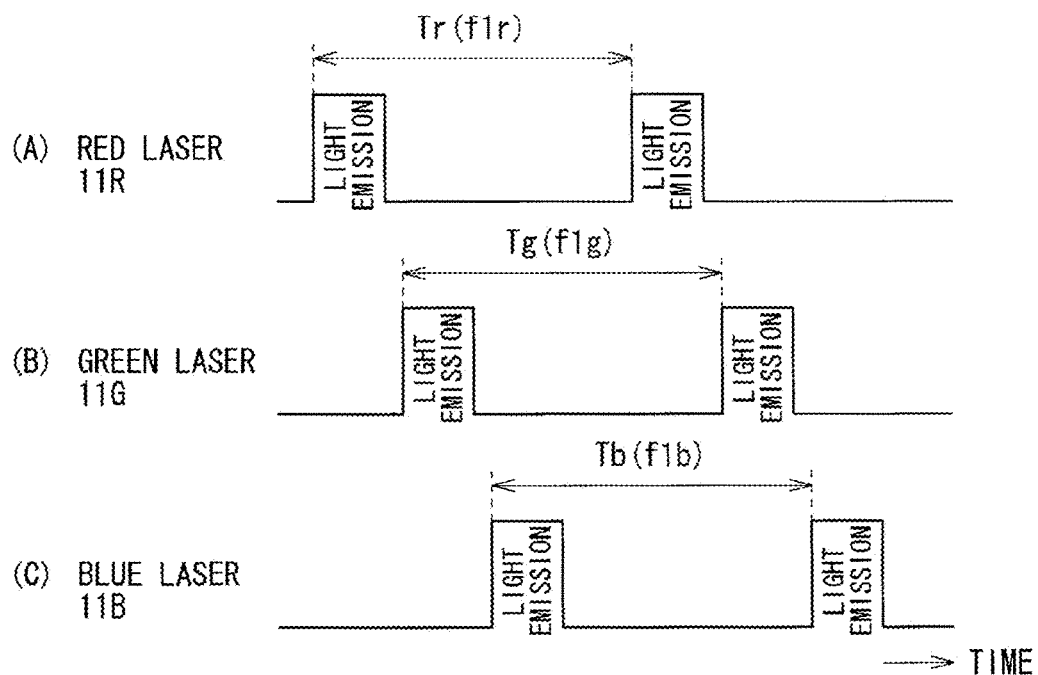

Parts (A) to (C) of FIG. 2 are timing diagrams depicting an example of a pulsed light emitting operation performed by each laser light source shown in FIG. 1.

Figure 3:
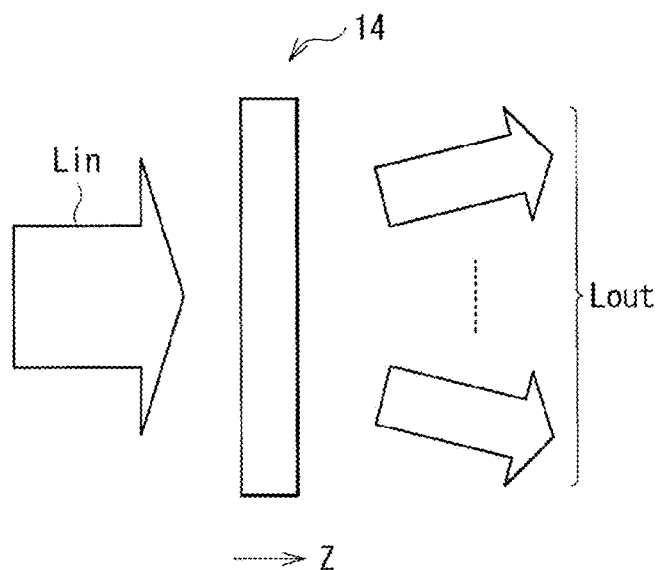

FIG. 3 is a schematic view for explaining a behavior of an optical element shown in FIG. 1.

Figure 4:
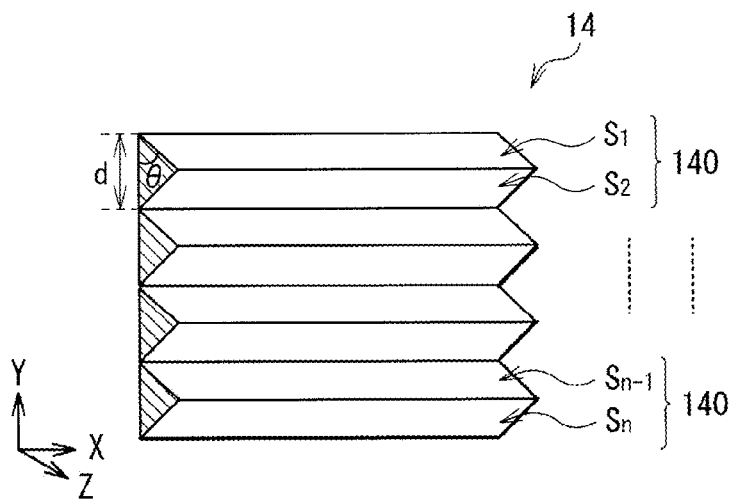

FIG. 4 is a perspective view schematically depicting an example of a detailed structure of a prism array, which is an example of the optical element shown in FIG. 1.

Figure 5:
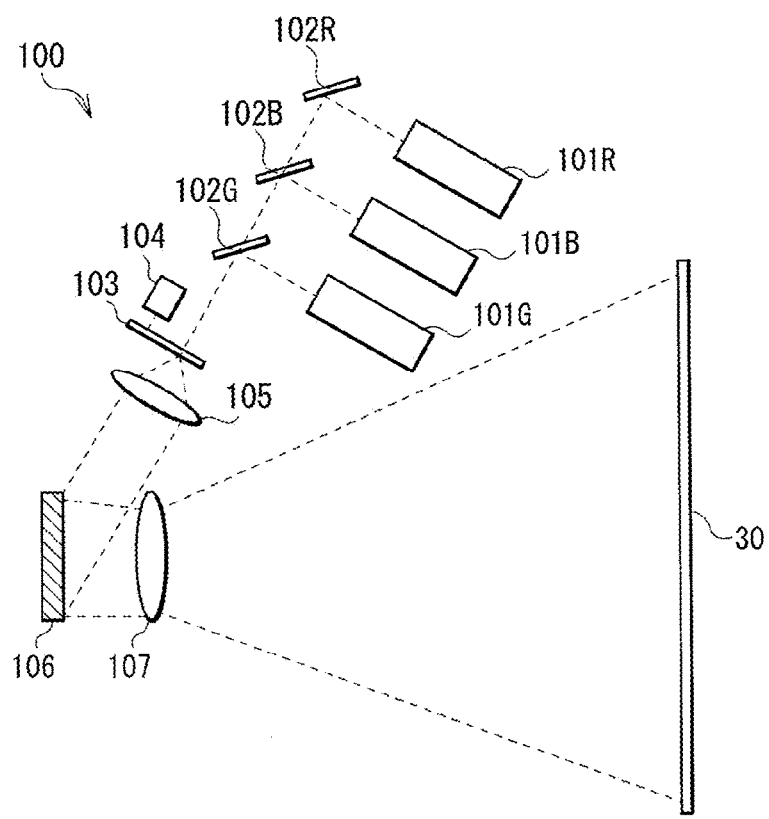

FIG. 5 is a view depicting a whole structure of a display device according to a comparative example.

Figure 6:
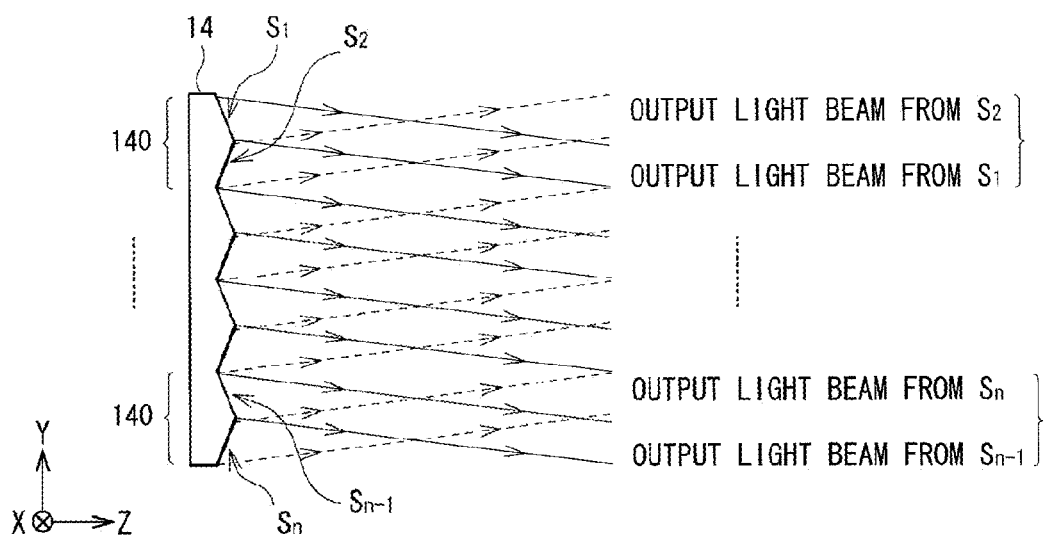

FIG. 6 is a schematic view for explaining a behavior of the prism array shown in FIG. 4.

Figure 7:
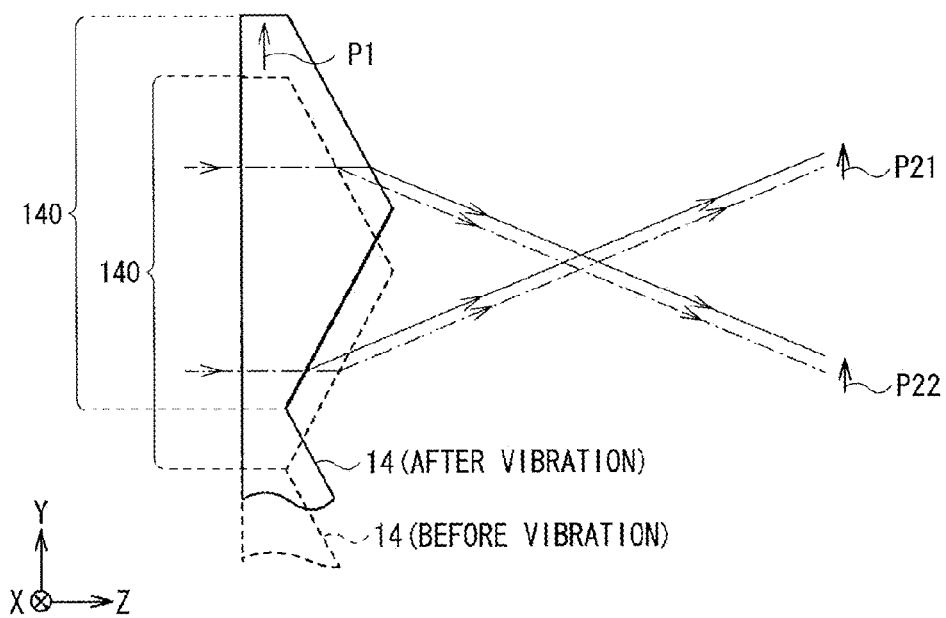

FIG. 7 is a schematic view for explaining beam scanning performed by the vibration of the prism array.

Figure 8:
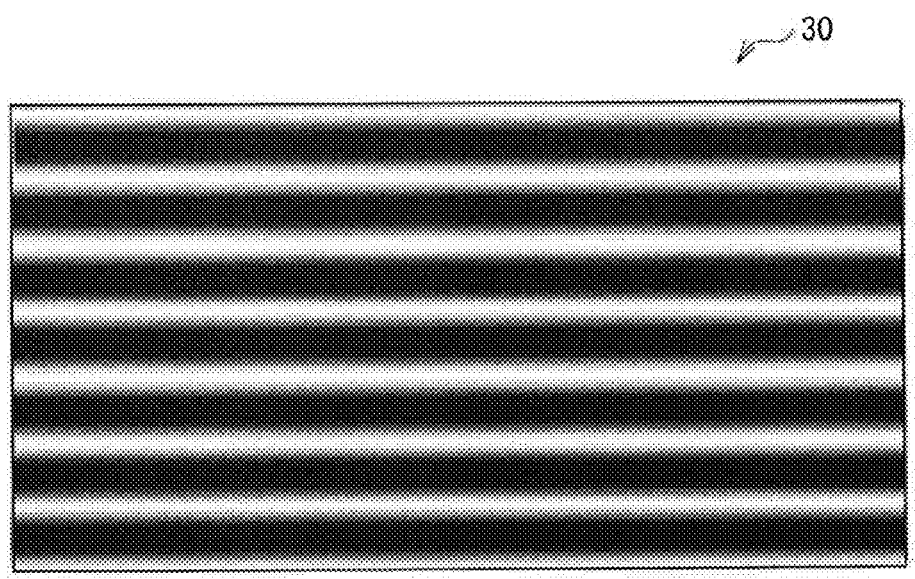

FIG. 8 is a schematic view depicting an example of recognizable luminance non-uniformity on a screen according to an embodiment of the present disclosure.

Figure 9:
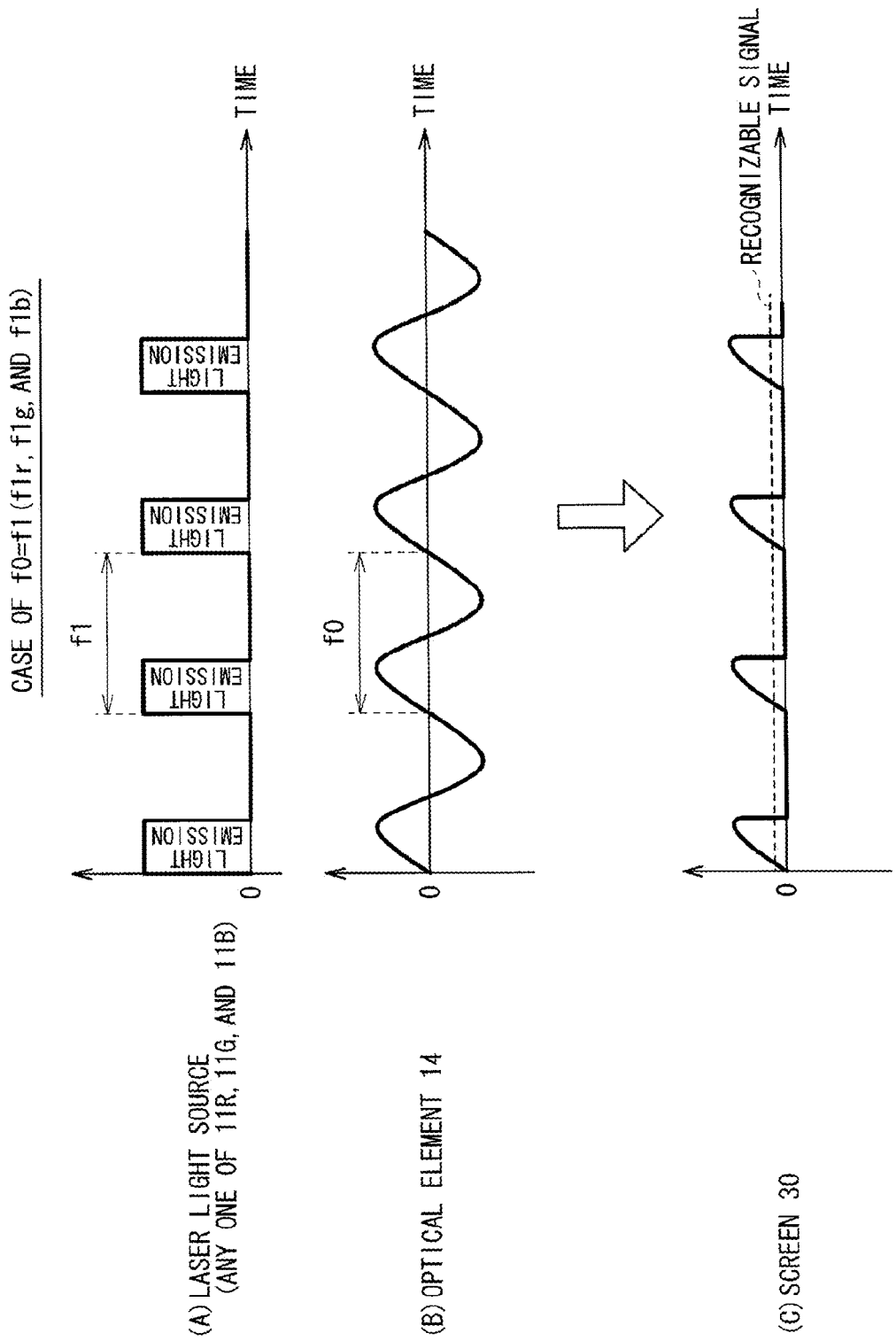

Parts (A) to (C) of FIG. 9 are timing diagrams depicting an example of a relationship among a light emitting frequency, a vibration frequency, and luminance non-uniformity on a screen.

Figure 10:
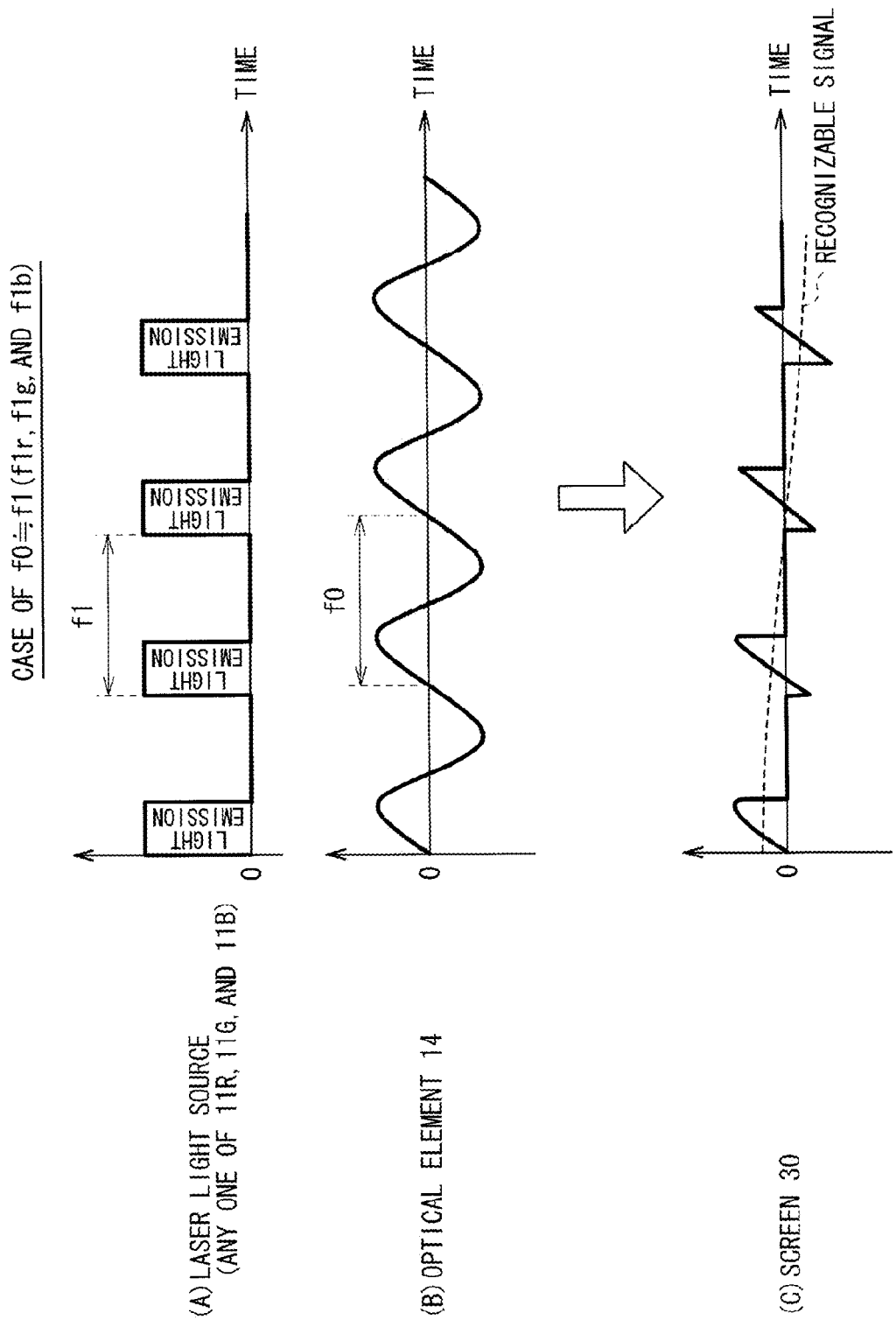

Parts (A) to (C) of FIG. 10 are timing diagrams depicting another example of a relationship among a light emitting frequency, a vibration frequency, and luminance non-uniformity on a screen.

Figure 11:
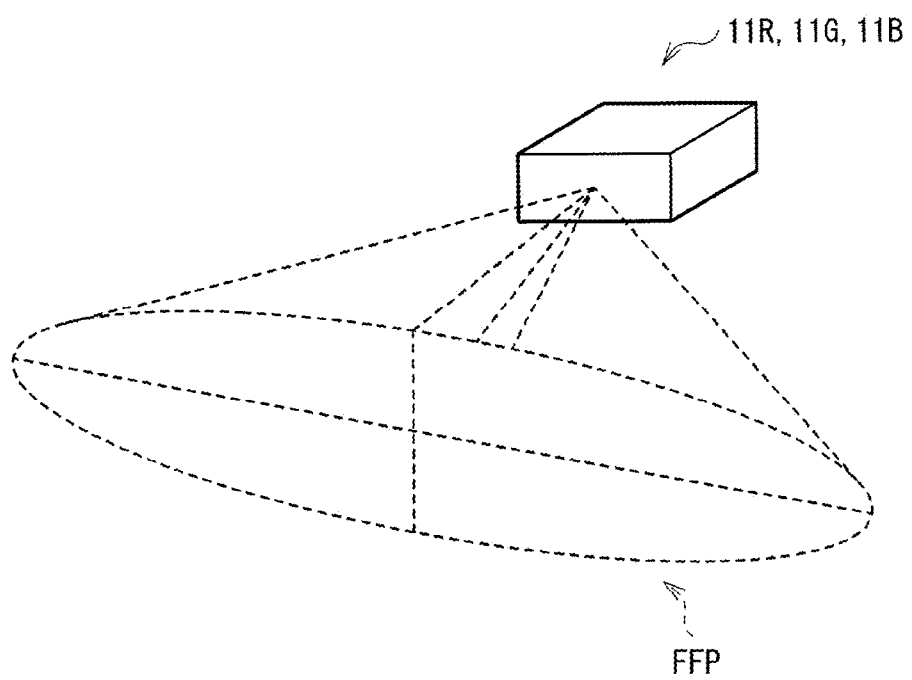

FIG. 11 is a schematic view depicting an example of a far field pattern (FFP) of a laser light beam emitted from each laser light source shown in FIG. 1.

FIGS. 12A and 12B are views for explaining an example of beat frequencies according to an embodiment of the present disclosure.

FIGS. 13A and 13B are views for explaining an example of frequency ranges that make it possible to prevent beat frequencies and a beat phenomenon according to an embodiment of the present disclosure.

Figure 14A:
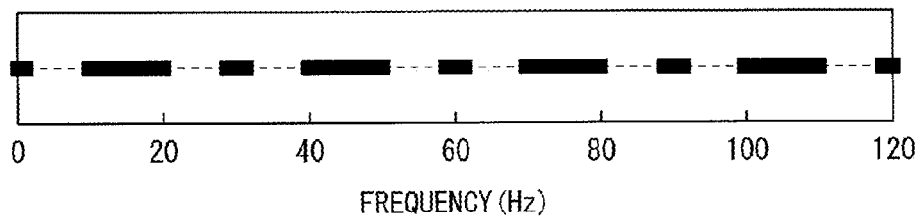
Figure 14B:
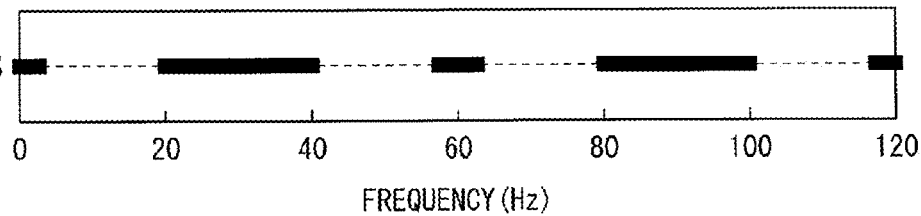
Figure 14C:
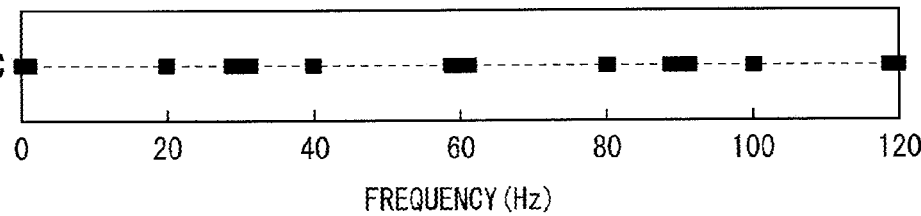

FIGS. 14A to 14C are views for explaining an example of frequency ranges that make it possible to prevent a beat phenomenon according to an embodiment of the present disclosure.

Figure 15A:
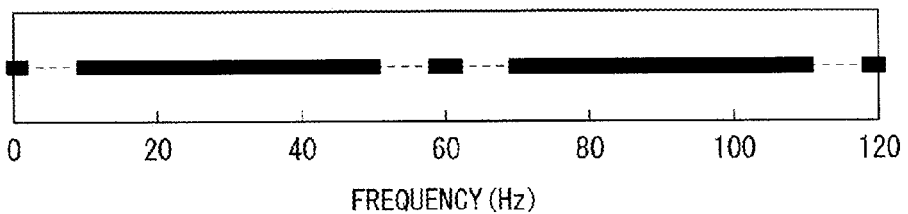
Figure 15B:
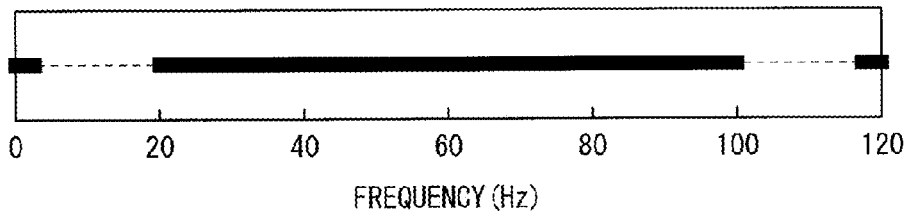
Figure 15C:
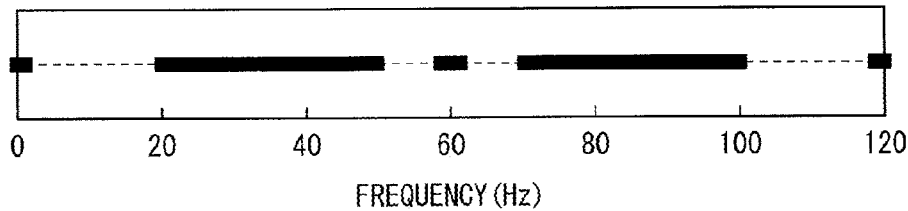

FIGS. 15A to 15C are views for explaining another example of frequency ranges that make it possible to prevent a beat phenomenon according to an embodiment of the present disclosure.

Figure 16:
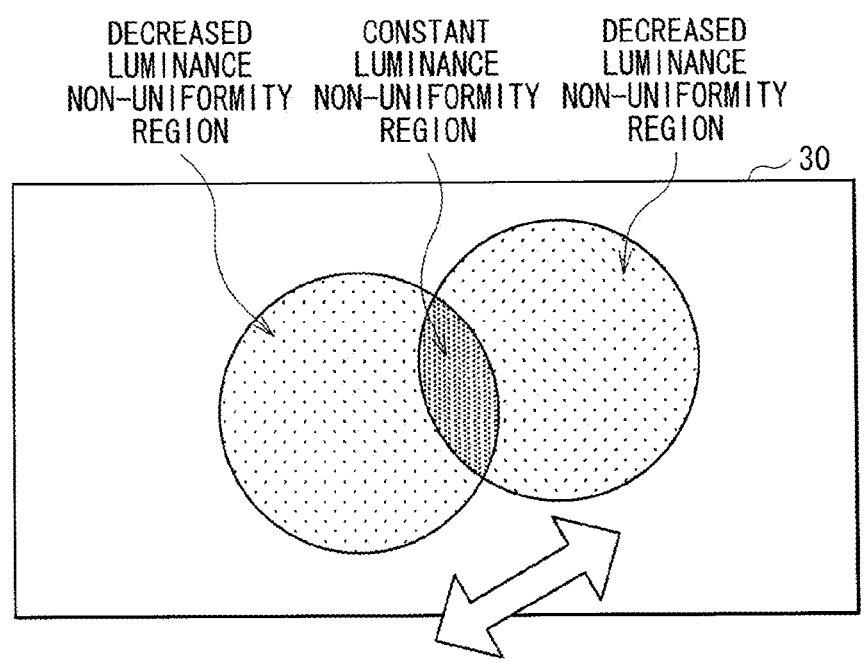

FIG. 16 is a schematic view for explaining among decreased luminance non-uniformity regions and a constant luminance non-uniformity region on a screen, and a spatial amplitude of luminance distribution by a vibration of the optical element.

Figure 17:
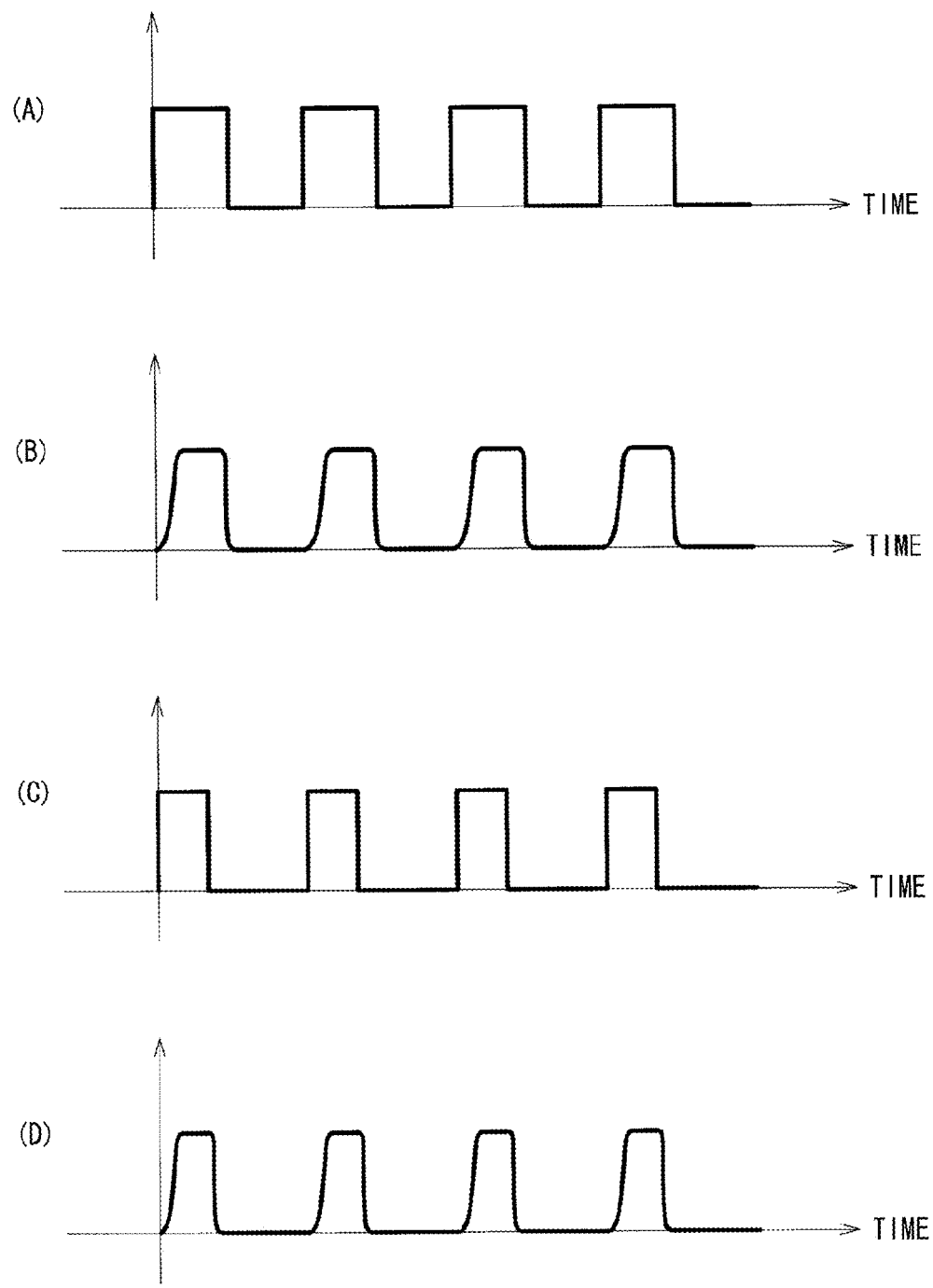

Parts (A) to (D) of FIG. 17 is a timing diagram depicting an example of light waveforms upon a pulsed light emitting operation performed by each laser light source.

FIGS. 18A and 18B are views for explaining an example of beat frequencies according to modification example 1.

Figure 19:
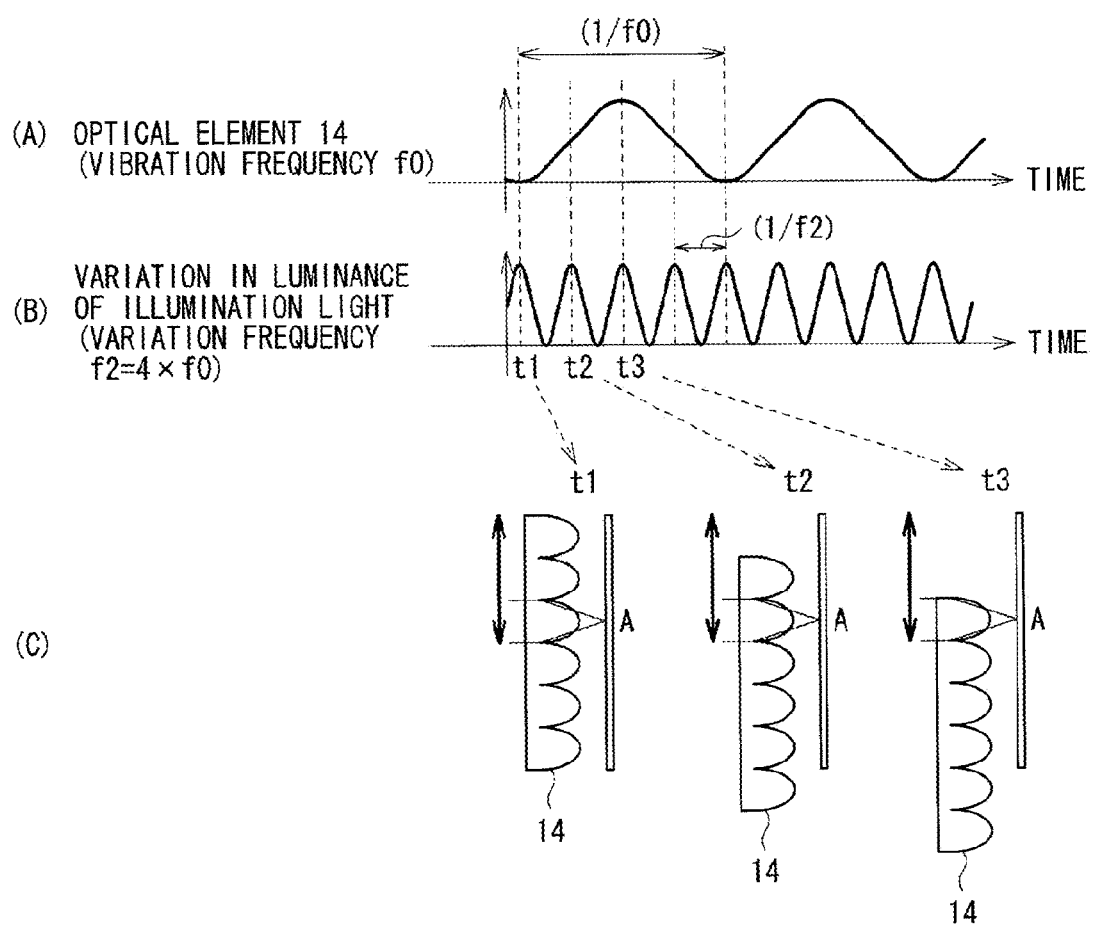

Parts (A) to (C) of FIG. 19 are views for explaining an example of a relationship between a vibration frequency and a variation frequency of luminance in illumination light.

Figure 20:
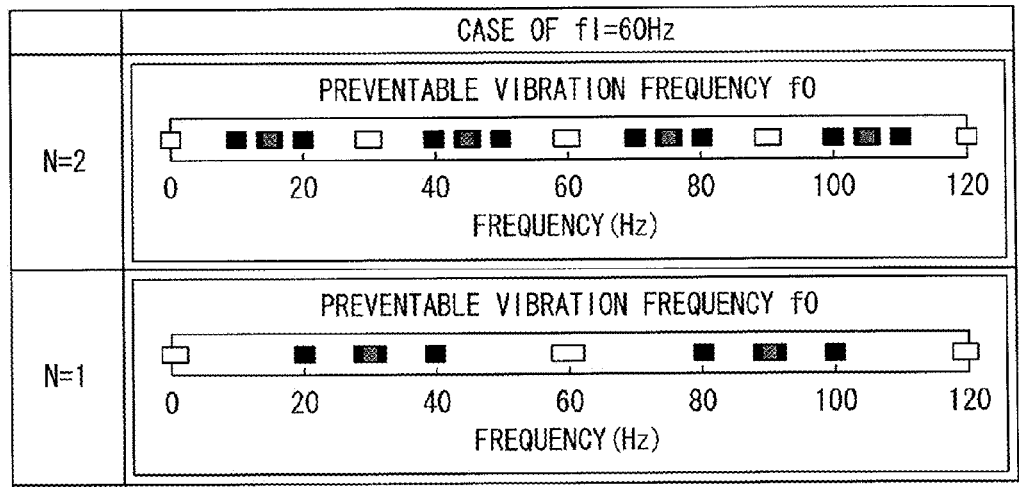

FIG. 20 is a view for explaining an example of frequency ranges that make it possible to prevent a beat phenomenon according to modification example 3.

Figure 21:
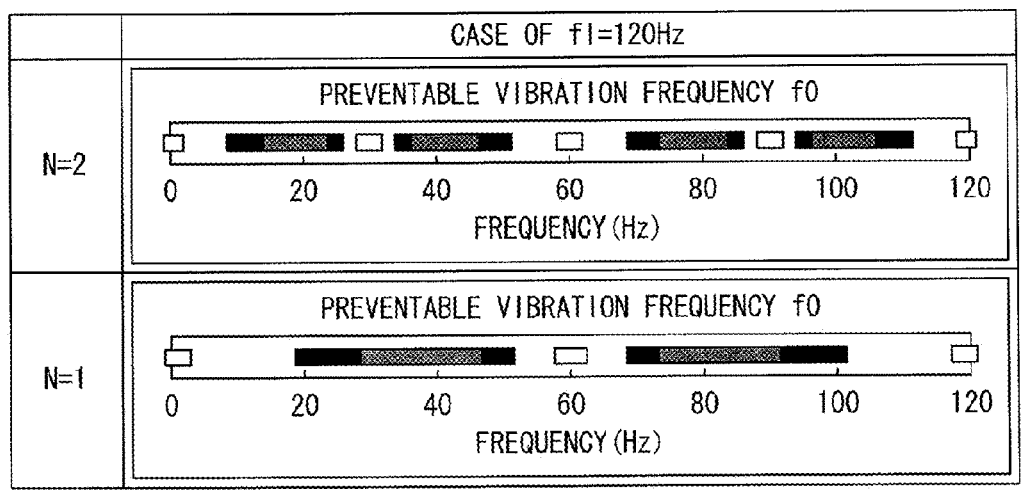

FIG. 21 is a view for explaining another example of frequency ranges that make it possible to prevent a beat phenomenon according to the modification example 3.

Figure 22:
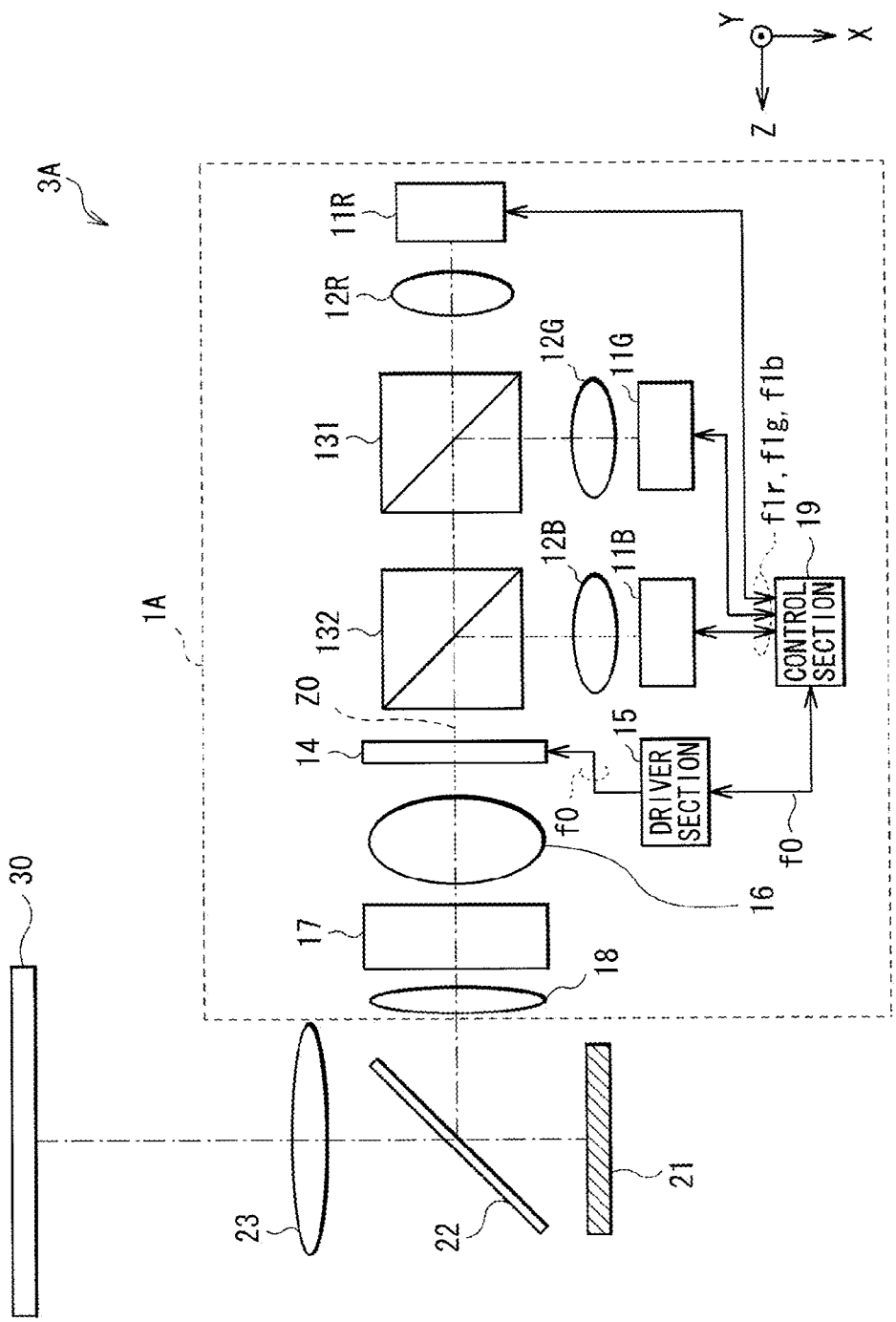

FIG. 22 is a view depicting a whole structure of a display device according to modification example 4.

Figure 23:
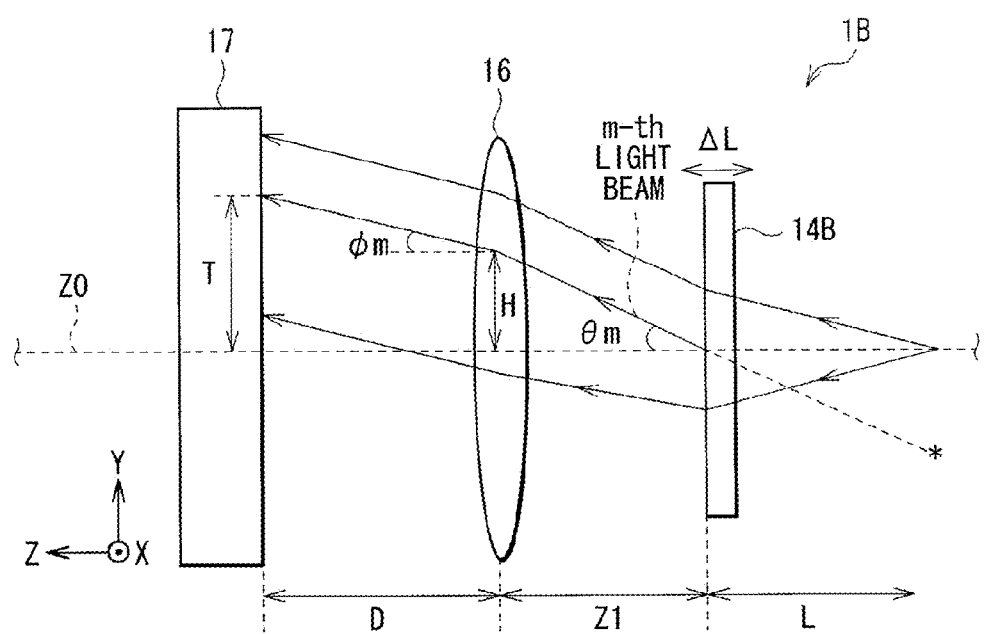

FIG. 23 is a view depicting a structure of main part of an illumination device according to modification example 5.

Figure 24:
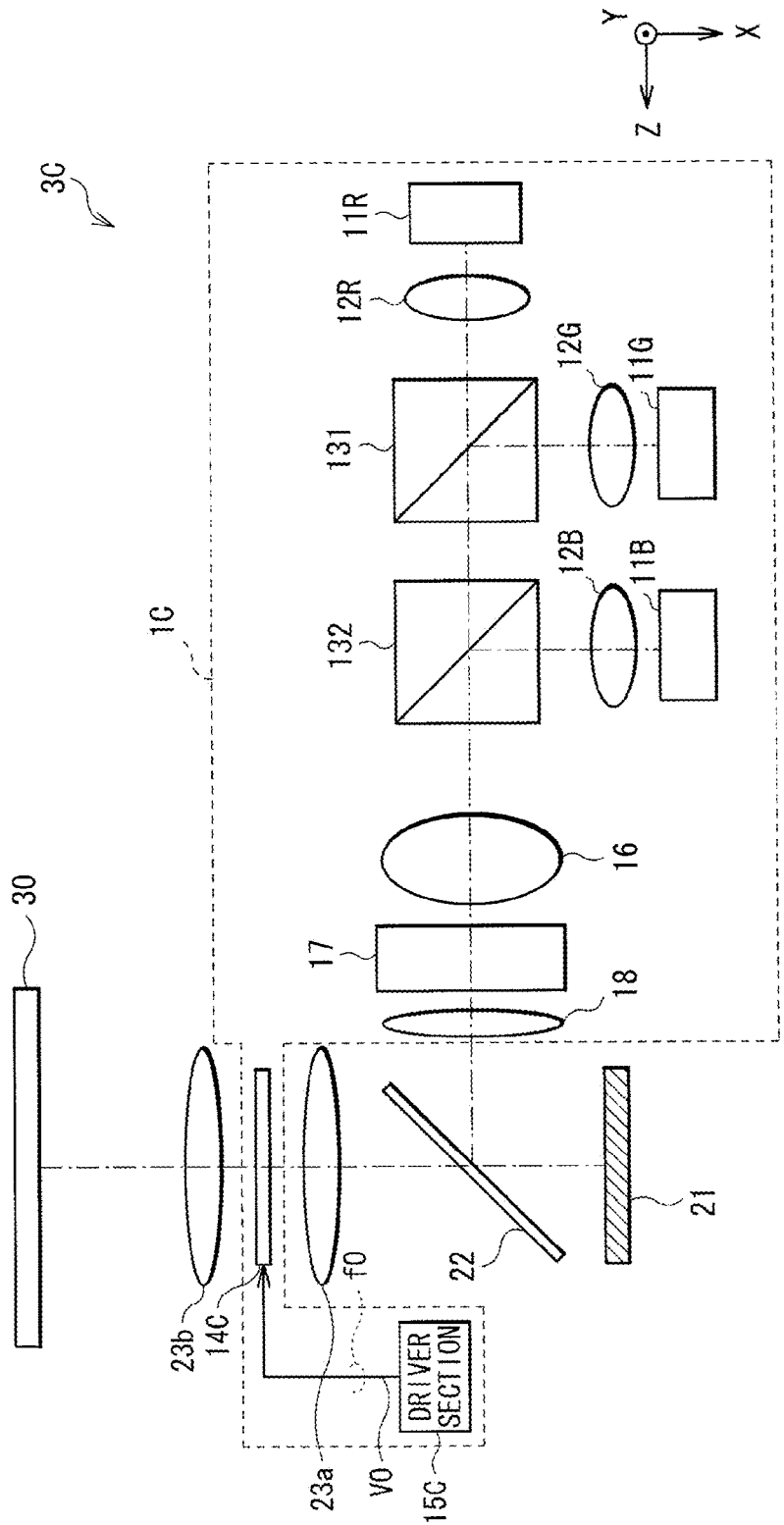

FIG. 24 is a view depicting a whole structure of a display device according to modification example 6.

Figure 25:
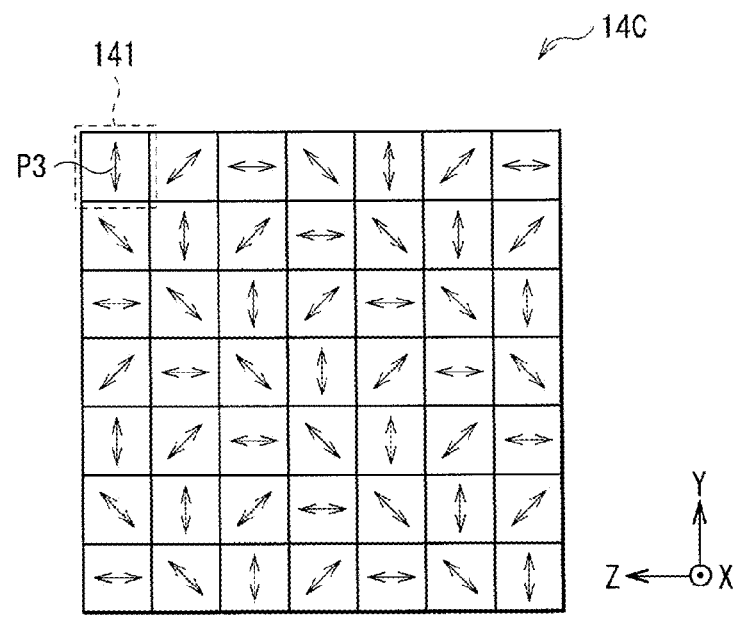

FIG. 25 is a plan view schematically depicting an example of a detailed structure of a liquid crystal element, which is an example of the optical element shown in FIG. 24.

Figure 26:
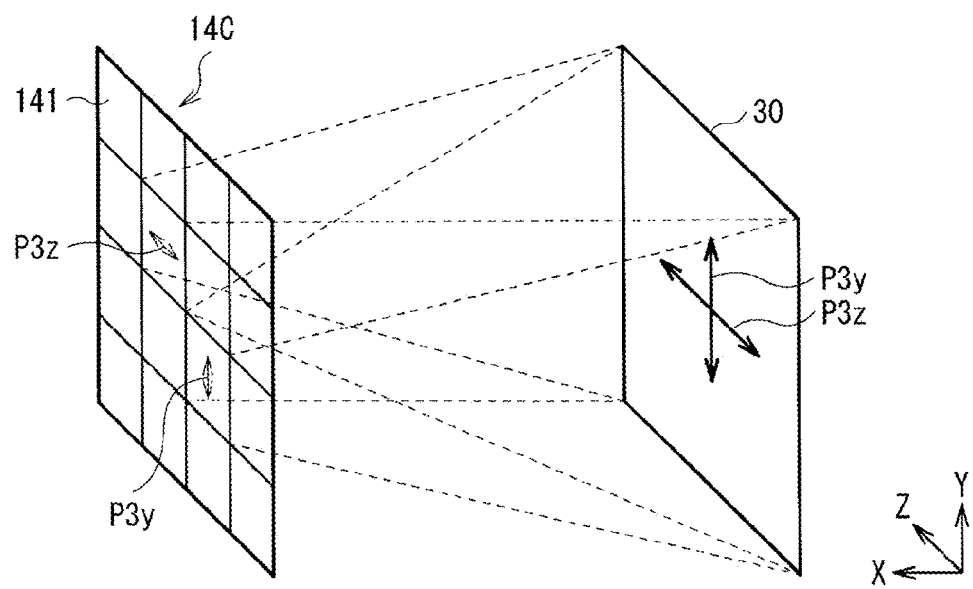

FIG. 26 is a schematic view for explaining a behavior of the liquid crystal element shown in FIG. 25.

Figure 27:
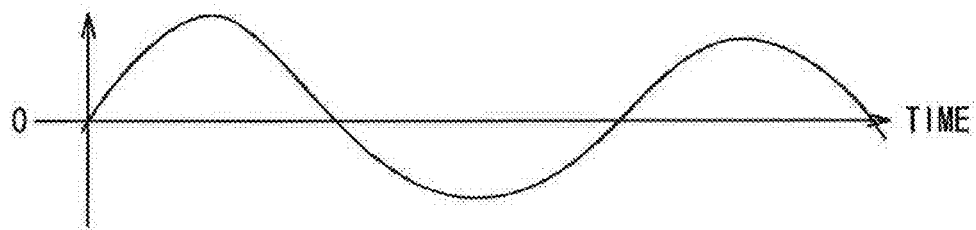

FIG. 27 is a characteristic view depicting an example of a change in a drive voltage applied to the liquid crystal element shown in FIG. 25 with time, and a change in an angle of a linear polarization of a laser light beam with time.

Figure 28:
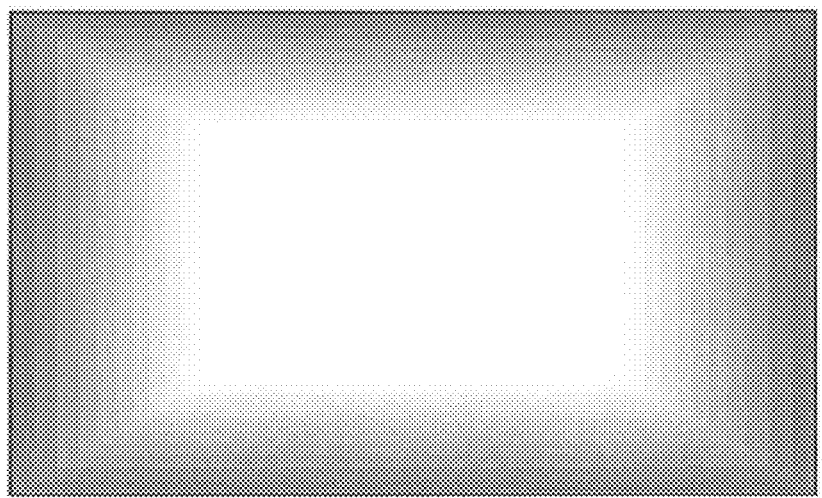

FIG. 28 is a schematic view depicting an example of recognizable luminance non-uniformity on a screen according to the modification example 6.

Figure 29:
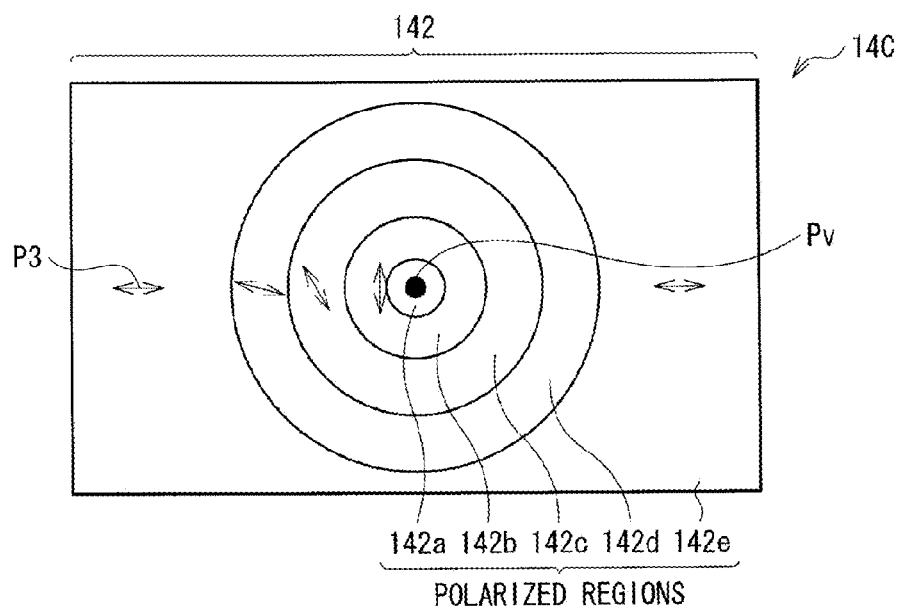

FIG. 29 is a plan view schematically depicting another example of a structure of the liquid crystal element, which is an example of the optical element shown in FIG. 24.

Figure 30A:
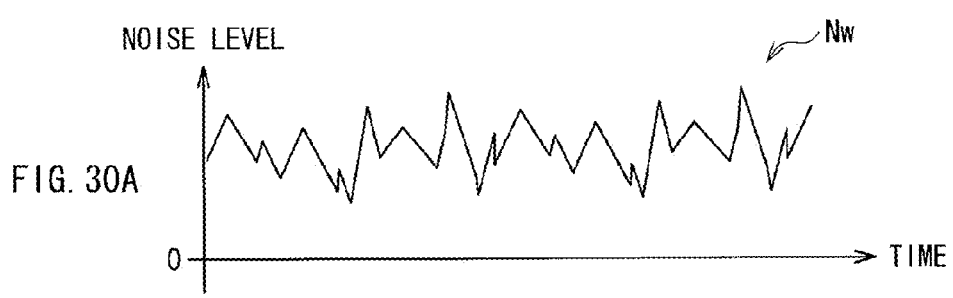
Figure 30B:
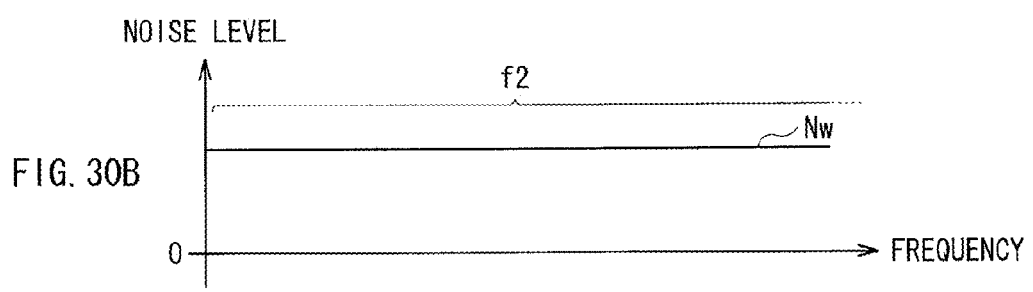

FIGS. 30A and 30B are characteristic views for explaining white noise according to modification example 7.

DETAILED DESCRIPTION

Thereinafter, an embodiment of the present disclosure will be described in detail, with reference to the accompanying drawings. The description will be given in the following order.
1. Embodiment (an example of using a prism array as an optical element)
2. Modification Examples
   Modification Example 1 (an example in which a duty ratio of a light waveform is not equal to 50%, and the light waveform is rounded)
   Modification Example 2 (an example in which a light emitting frequency contains multiple frequency components)
   Modification Example 3 (an example in which a relationship between a vibration frequency and a variation frequency of luminance in illumination light is considered)
   Modification Example 4 (an example in which a control section dynamically controls a light emitting frequency and a vibration frequency)
   Modification Example 5 (an example of using a diffraction element as an optical element)
   Modification Example 6 (an example of using a liquid crystal element as an optical element and electrically vibrating the liquid crystal element)
   Modification example 7 (an example in which white noise is considered for luminance non-uniformity)
   Other modification examples

EMBODIMENT

Whole Structure of Display Device 3

FIG. 1 shows a whole structure of a display device (display device 3) according to an embodiment of the present disclosure. This display device 3 is a projection display device that projects an image (or an optical image) onto a screen 30 (or a projected surface). Specifically, the display device 3 includes an illumination device 1, and an optical system (or a display optical system) that displays an image by using illumination light from the illumination device 1.
(Illumination Device 1)
The illumination device 1 includes a red laser 11R, a green laser 11G, a blue laser 11B, lenses 12R, 12G, and 12B, dichroic prisms 131 and 132, an optical element (prism array) 14, a driver section 15, a collimator lens 16, a fly eye lens 17, and a condenser lens 18. Note that a reference mark "Z0" in this figure represents an optical axis.

The red laser 11R, the green laser 11G, and the blue laser 11B correspond to three types of light sources, and emit a red laser light beam, a green laser light beam, and a blue laser light beam, respectively. These laser light sources constitute a light source section, and each of the light sources is a laser light source in this embodiment. Each of the red laser 11R, the green laser 11G, and the blue laser 11B may be, for example, a semiconductor laser, a solid-state laser, or the like. If each laser light source is a semiconductor laser, as one example, the wavelengths $\lambda r$, $\lambda g$, and $\lambda b$ of the red, green, and blue laser light beams are about 600 nm to 700 nm, 500 nm to 600 nm, and 400 nm to 500 nm, respectively.

Each of the red laser 11R, the green laser 11G, and the blue laser 11B is configured to emit a pulsed light beam, for example, as shown in Parts (A) to (C), respectively, of FIG. 2. In more detail, the red laser 11R emits a red laser light beam intermittently (not continuously) at a predetermined light emitting frequency f1r [Hz] (or during a light emitting period Tr=1/f1r). The green laser 11G emits a green laser light beam intermittently (not continuously) at a predetermined light emitting frequency f1g [Hz] (or during a light emitting period Tg=1/f1g). The blue laser 11B emits a blue laser light beam intermittently (not continuously) at a predetermined light emitting frequency f1b [Hz] (or during a light emitting period Tb=1/f1b). Furthermore, the red laser light beam, the green laser light beam, and the blue laser light beam are emitted sequentially in this order in accordance with a time division manner, as shown in Parts (A) to (C), respectively, of FIG. 2. In this embodiment, the light emitting frequencies f1r, f1g, and f1b represent corresponding fundamental frequencies. As one example, the light emitting frequencies f1r, f1g, and f1b are equal to one another (hereinafter, indicated by "f1r=f1g=f1b=f1" as appropriate). In addition, the light emitting frequency f1 may typically be about 60 [Hz] to 120 [Hz], but is not limited thereto. The light emitting frequency f1 may be determined in accordance with the display quality, etc. of the projector (display device 1).

The lenses 12R and 12G are lenses (or coupling lenses) that collimate the red laser light beam and the green laser light beam emitted from the red laser 11R and the green laser 11G, respectively, then allowing the collimated light beams to enter the dichroic prism 132. Likewise, the lens 12B collimates the laser light beam emitted from the blue laser 11B, thus allowing the collimated light beam to enter the dichroic prism 132. Note that each of the lenses 12R, 12G, and 12B collimates the incident light beam (or generates the collimated light beam), but the embodiment is not limited thereto. Alternatively, each of the lenses 12R, 12G, and 12B may not collimate the incident light beam (or may not generate the collimated light beam). However, it is considered that collimating the light beams as described above is more preferable in terms of the compactness of the device structure.

The dichroic prism 131 is a prism that allows the red laser light beam incident from the lens 12R to selectively pass therethrough, and selectively reflects the green laser light beam incident from the lens 12G. The dichroic prism 132 is a prism that allows the red laser light beam and the green laser light beam incident from the dichroic prism 131 to selectively pass therethrough, and selectively reflects the blue laser light beam incident from the lens 12B. Consequently, the red laser light beam, the green laser light beam, and the blue laser light beam are subjected to a color synthesis (or an optical path composition).

The optical element (prism array) 14 is located on an optical path between the respective light sources and the fly eye lens 17 (or more specifically, on an optical path between the dichroic prism 132 and the collimator lens 16). Note that the optical element 14 corresponds to a concrete example of an "optical element" according to an embodiment of the present disclosure. The prism array 14 is an optical element used to reduce speckle noises (interference patterns) (described hereinafter), and is located such that the laser light beam traveling on the optical axis Z0 shown in FIG. 1 passes therethrough. In more detail, the individual laser light beams (or the red, green, and blue laser light beams) which have been emitted intermittently from the light source section (or the red laser 11R, the green laser 11G, and the blue laser 11B, respectively) at the light emitting frequency f1 (=f1r, f1g, or f1b) pass through the prism array 14.

The "optical element" according to an embodiment of the present disclosure, an example of which is the above prism array 14, separates an incident light ray (or an incident light beam Lin) into light rays traveling in two or more different directions (or in two or more directions different from one another), and emits the light rays, as output light beams Lout, for example, as shown in FIG. 3. In more detail, when the incident light beam Lin enters the optical element, this optical element does not emit the output light beams Lout in a single direction by changing the optical path of the incident light beam Lin, but in two or more (non-symmetric) directions by applying a phase difference thereto.

FIG. 4 is a perspective view schematically depicting an example of a detailed structure of the prism array 14. The prism array 14 has a configuration in which multiple (n/2 in this embodiment (n: integer equal to/more than two)) prisms 140 (structural unit) are arranged side-by-side on a Y axis (or in a vibration direction of the prism array 140 (described hereinafter)). Each prism 140 has a pair of inclined surfaces formed on the output side (+Z axis side) of a laser light beam while extending in an X axis. In more detail, the prisms 140 are arranged side-by-side in a direction (Y axis direction) perpendicular to a direction (X axis direction) where the pairs of inclined surfaces extend on a light output surface (X-Y plane). Specifically, in a direction from the positive side to the negative side on the Y axis shown in the figure, a first prism 140 has a pair of inclined surfaces S1 and S2 (first surface and second surface), then a second prism 140 has a pair of inclined surfaces S3 and S4 (third surface and fourth surface), and so on. Finally, a (n/2)th prism 140 has a pair of inclined surface Sn−1 and Sn ((n−1)th surface and (n) th surface). Thus, each prism 140 has a shape of a triangle pole extending in the X axis ("d" denotes a pitch of the prism 140 (prism pitch) on the Y axis, and "θ" denotes an inclined angle of each inclined surface), and raised (convex) portions and depressed (concave) portions are formed alternately throughout the light output surface. Note that in this embodiment, the convex portion (inclined surfaces) of each prism 140 is provided on the light output surface, but the structure of each prism 140 is not limited thereto. The convex portion of each prism 140 may be provided on either or both of the light incident surface and the light output surface. Detailed function of this prism array 14 will be described hereinafter (see FIGS. 6 and 7).

The driver section 15 drives the prism array 14 at a predetermined frequency, thereby changing coherency (one or more of the position, angle, polarization, and phase in this embodiment) of the laser light beam. Specifically, in this embodiment, the driver section 15 mechanically (and slightly) vibrates the prism array 14 at a predetermined vibration frequency f0 as the above driving frequency, thereby changing one or both of the position and angle of the laser light beam.

The driver section 15 changes the relative position between the prism array 14 and the fly eye lens 17, thereby changing one or both of the incident position and the incident angle of the laser light beam (namely, the incident position, the incident angle, or both incident position and incident angle) on the incident surface of the fly eye lens 17. Furthermore, in this embodiment, the driver section 15 (slightly) vibrates the prism array 14 (concretely, vibrates the prism array 14 in the Y axis direction that corresponds to an arrangement direction of the prisms 140 as shown in FIG. 4), thereby changing the above relative position. The detail of a technique (one of features in this embodiment) for specifying (determining) the vibration frequency f0 at which the prism array 14 vibrates as described above will be described hereinafter. In this embodiment, the vibration frequency f0 means a primary frequency having the maximum amplitude (but, a case where such a primary frequency does not exist (white noise is considered, etc.) will be described in modification example 7). Note that this driver section 15 may include, for example, a coil and a permanent magnet (for example, a permanent magnet made of a material such as neodymium (Nd), iron (Fe), and boron (B)).

The collimator lens 16 is disposed on the optical path between the prism array 14 and the fly eye lens 17, and is a lens that collates a light beam emitted from the prism array 14, thereby producing a collimated light beam.

The fly eye lens 17 is an optical member (or an integrator) in which multiple lenses are arranged two-dimensionally on a substrate, and spatially separates an incident light ray in accordance with the arrangement of the lenses, then emitting the separated light rays. Consequently, the light ray that has entered the fly eye lens 17 is made uniform (the intensity distribution thereof on the plane is made uniform), and is emitted therefrom as illumination light. Note that this fly eye lens 17 corresponds to a concrete example of an "optical member" according to an embodiment of the present disclosure.

The condenser lens 18 is a lens that receives the light (illumination light) that has been made uniform by the fly eye lens 17 and that focuses this light.

(Display Optical System)

The above-described display optical system includes a polarization beam splitter (PBS) 22, a reflective liquid crystal element 21, and a projection lens 23 (or a projection optical system).

The polarization beam splitter 22 is an optical member that allows specific polarized light (for example, P polarized light) to selectively pass therethrough, whereas selectively reflecting another polarized light (for example, S polarized light). Consequently, the illumination light (for example, S polarized light) from the illumination device 1 is selectively reflected by the polarization beam splitter 22, and then, enters the reflective liquid crystal element 21. In addition, an optical image (for example, P polarized light) that has been emitted from the reflective liquid crystal element 21 selectively passes through the polarization beam splitter 22, and then, is incident on the projection lens 23.

The reflective liquid crystal element 21 is a light modulation element that reflects the illumination light from the illumination device 1 while modulating the illumination light, on the basis of an image signal to be supplied from a display control section (not shown), thus emitting an optical image. In this embodiment, the reflective liquid crystal element 21 reflects the illumination light, such that respective polarizations (such as S and P polarizations) of incident light and reflected light differ from each other. This reflective liquid crystal element 21 may be made of a liquid crystal element of, for example, an LCOS (liquid crystal on silicon).

The projection lens 23 is a lens which projects (and magnifies) the illumination light (optical image) that has been modulated by the reflective liquid crystal element 21 onto the screen 30.

(Functional Effect of Display Device 3)

(1. Display Operation)

In the illumination device 1 of the above-described display device 3, as shown in FIG. 1, first, the red laser 11R, the green laser 11G, and the blue laser 11B individually emit light beams (laser light beams), and the light beams are converted into collimated light beams by the lenses 12R, 12G, and 12B. Then, the collimated laser light beams (or red, green, and blue laser light beams) are subjected to the color synthesis (or optical path composition) by the dichroic prisms 131 and 132. The laser light beam that has been subjected to the optical path composition passes through the prism array 14, and is converted into a collimated light beam by the collimator lens 16, then entering the fly eye lens 17. This light beam (intensity distribution thereof on the plane) is made uniform by the fly eye lens 17, and is emitted therefrom. Then, the light beam is focused by the condenser lens 18. In this way, the illumination light is emitted from the illumination device 1.

Next, the illumination light is selectively reflected by the polarization beam splitter 22, and then, is incident on the reflective liquid crystal element 21. The incident light is reflected by the reflective liquid crystal element 21 while being modulated on the basis of an image signal. Then, the reflected, modulated light is emitted therefrom as an optical image. In this case, light incident on the reflective liquid crystal element 21 and light emitted therefrom have different polarizations. Accordingly, the optical image emitted from the reflective liquid crystal element 21 selectively passes through the polarization beam splitter 22 and, then enters the projection lens 23. Finally, this light (optical image) is (magnified and) projected onto the screen 30 by the projection lens 23.

In this embodiment, each of the red laser 11R, the green laser 11G, and the blue laser 11B intermittently emits a light beam at the predetermined frequency f1 (=f1r, f1g, or f1b), for example, as shown in Parts (A) to (C) of FIG. 2. Thus, the laser light beams (red, green, and blue laser light beams) are emitted sequentially in a time division manner. Following this, the laser light beams are modulated sequentially in a time division manner, on the basis of an image signal containing color components (red, green, and blue components) by the reflective liquid crystal element 21. In this way, the display device 3 displays a color image, on the basis of the image signal.

(2. Functional Effect)

Next, a description will be given below in detail, of a functional effect produced by the illumination device 1 in comparison with a comparative example.

2-1. Comparative Example

FIG. 5 depicts a whole structure of a display device (display device 100) according to a comparative example. The display device 100 of the comparative example is a projection display device that projects an optical image onto the screen 30, similar to the display device 3 of this embodiment. This display device 100 includes a red laser 101R, a green laser 101G, a blue laser 101B, dichroic mirrors 102R, 102G, and 102B, a diffusing element 103, a motor (driver section) 104, a lens 105, a light modulation element 106, and a projection lens 107.

In the display device 100, the red laser 101R, the green laser 101G, and the blue laser 101B emit laser light beams of corresponding colors, and then, the dichroic mirrors 102R, 102G, and 102B subject the laser light beams to a color synthesis (optical path composition). The synthesized light beam enters the diffusing element 103. The diffusing element 103 scatters the incident light beam, and the lens 105 irradiates the light modulation element 106 with the light beam as illumination light. This light modulation element 106 reflects the illumination light while modulating the illumination light, on the basis of an image signal, then emitting the reflected, modulated light as an optical image. The projection lens 107 (magnifies and) projects the optical image onto the screen 30. Consequently, the display device 100 displays a color image, on the basis of the image signal.

Generally, when coherent light, such as laser light, is irradiated on a diffusing surface, spotty patterns are observed thereon, as opposed to using other types of light. Such patterns are called "speckle patterns". The light irradiated on the diffusing surface is scattered thereon, and scattered lights having random phases in accordance with the unevenness of the surface interfere with one another, so that speckle patterns are generated.

When a projector provided with a laser light source, such as the above display device 100 of the comparative example, projects an optical image onto a screen, speckle patterns (or interference patterns) are overlaid over an image displayed on the screen. Since recognized as intense random noises by human eyes, these patterns are prone to lower the displayed image quality.

In order to reduce the generation of such speckle patterns (or speckle noises) generated by a projector provided with a laser light source, a technique may be contemplated in which a screen or a predetermined optical element through which a laser light beam passes in the projector is slightly vibrated. Generally, it is difficult for human eyes and brains to recognize flickers appearing in a period of about 20 ms to 50 ms. Thus, human eyes integrate and average the variation in an image over this period. Therefore, if a lot of independent speckle patterns are overlaid on a screen, the speckle noises are averaged so as to be less prominent for human eyes.

In consideration of the above, in the display device 100 of the comparative example, the motor 104 mechanically rotates the diffusing element 103, thereby displacing (or slightly vibrating) the speckle patterns on the screen 30 at a high speed, and reducing the generation of the speckle noises.

2-2. Embodiment

In contrast, in the illumination device 1 of this embodiment, the driver section 15 drives the optical elements 14 (prism array), in order to (slightly) vibrate the optical element 14 through which a laser light beam passes. This reduces the generation of the speckle noises (or interference patterns) generated due to the laser light beam, as will be described in detail hereinafter.

(A. Functional Effect of Decreasing Interference Patterns)

First, when a light beam enters the prism array 14, the prism 140 emits respective light beams from the pairs of inclined surfaces thereof in the following manner. As shown in FIG. 6, the light beams are emitted from the pair of inclined surfaces in each prism 140, in such a way that the positions of the incident light beams are opposite to those of the output light beams on a plane located away from the prism array 14 by a predetermined distance (or located on the incident surface of the fly eye lens 17, in this case). Specifically, in the above first prism 140 of the prism array 14, positions of light beams that enter the inclined surfaces $S_1$ and $S_2$ are reversed on the incident surface of the fly eye lens 17. In more detail, a light beam that has been emitted from the inclined surface $S_1$ travels toward the position of another light beam has entered the inclined surface $S_2$ (or toward the lower position of the output surface of the first prism 140). Meanwhile, a light beam that has been emitted from the inclined surface S2 travels toward the position of another light beam has entered the inclined surface $S_1$ (or toward the upper position of the output surface of the first prism 140). Likewise, in the above (n/2)th prism 140, positions of light beams that enter the inclined surfaces $S_{n-1}$ and $S_n$ are reversed on the incident surface of the fly eye lens 17. In more detail, a light beam that has been emitted from the inclined surface $S_{n-1}$ travels toward the position of another light beam that has entered the inclined surface $S_n$ (or toward the lower position of the output surface of the (n/2)th prism 140). Meanwhile, a light beam that has been emitted from the inclined surface $S_n$ travels toward the position of another light beam that has entered the inclined surface $S_{n-1}$ (or toward the upper position of the output surface of the (n/2)th prism 140). Note that the function where the positions of the light beams are reversed after being emitted from the prism 140 is adjusted arbitrarily by the prism pitch d and the inclined angle θ shown in FIG. 4.

The driver section 15 displaces the relative position between the prism array 14 and the fly eye lens 17. Specifically, the driver section 15 vibrates the prism array 14 in a direction where the prisms 140 are arranged on a plane perpendicular to the optical axis Z0 (or in the Y axis direction), for example, as indicated by an arrow P1 in FIG. 7, in order to displace the relative position. In this case, the respective positions of the light beams that have been emitted from the inclined surfaces in each prism 140 (in such a way that the positions thereof on the pair of inclined surfaces are reversed) are also displaced (or shifted) in the Y axis direction, for example, as indicated by arrows P21 and P21 in FIG. 7. As a result, the light beams emitted from the prisms 140 in the prism array 14 perform beam scanning for the incident surface in the fly eye lens 17. This reduces the generation of the speckle noises (or interference patterns) generated due to the laser light beam by employing the above-described principle (multi-overlaying (temporal averaging) of speckle patterns).

In this embodiment, the driver section 15 displaces the relative position between the prism array 14 and the fly eye lens 17 (or vibrates the prism array 14 itself, in this case), in order to change one or both of the incident positions and the incident angles of the laser light beams on the incident surface of the fly eye lens 17. This attenuates or prevents the optical loss of the light beam upon entering the fly eye lens 17 from the prism array 14, even if the above relative position is displaced (or the beam scanning is performed). The technique that the display device 100 of the comparative example employs scatters the light beam entering the diffusing element 103 by using the diffusing element 103 itself. This may cause the decrease in the utilization efficiency of the light beam. In contrast to the technique of the comparative example, the display device 3 of this embodiment is configured to reduce the generation of the speckle noises by using the multi-overlaying (temporal average) while minimizing or preventing the loss of the laser light beam.

(B. Functional Effect of Decreasing Luminance Non-Uniformity)

(Outline of Principle of Generating Luminance Non-Uniformity)

As described above, the slight vibration of the optical element (prism array 14) reduces the generation of the interference patterns. In this case, however, this vibration may cause the luminance (or illumination) non-uniformity in the illumination light, for example, as shown in FIG. 8. This leads to the lowering of the display image quality. Such luminance non-uniformity is generated due to using the prism array 14 in order to reduce the generation of the interference patterns, instead of using a diffuser plate as in the display device 100 of the comparative example.

In the display device 1, the prism array 14 changes (or bends) the optical path of the incident light beam Lin without decreasing the utilization efficiency (or scattering the light), as opposed to a diffuser plate. Accordingly, luminance non-uniform is likely to be generated in the illumination light (on the screen 30), in principle. For example, when the prism array 14 is used, the shades of the uneven surfaces (or the inclined surfaces $S_1$ to $S_n$) in each prism 140 are likely to create the luminance non-uniformity in the illumination light. However, if the angle of the uneven surfaces (or the inclined angle θ of the inclined surfaces $S_1$ to $S_n$) is decreased such that the luminance non-uniformity becomes less prominent, the effect of reducing the interference patterns is lessened (the decreased amount is small), which is meaningless.

The above luminance non-uniformity is reduced by vibrating the prism array 14 to a certain extent. Nevertheless, the luminance non-uniformity may become more prominent, depending on a certain relationship between the vibration frequency f0 of the prism array 14 and the light emitting frequency f1 of the laser light beams. Specifically, a beat phenomenon (described in detail hereinafter) may (or is likely to) occur, depending on a combination of the vibration frequency f0 and the light emitting frequency f1, thus making the luminance non-uniformity more recognizable. In more detail, when the vibration frequency f0 and the light emitting frequency f1 are close to each other, the combination thereof may generate a beat frequency. This makes non-uniform luminance moving slowly on the image more recognizable.

If the laser light source emits a light beam as shown in Part (A) of FIG. 9, and the optical element (prism array) 14 vibrates as shown in Part (B) of FIG. 9 (or if the vibration frequency f0 is equal to the light emitting frequency f1), the luminance of the illumination light (or the optical image on the screen 30), which is obtained by multiplying the above waveforms, is, for example, as shown in Part (C) of FIG. 9. Thus, the luminance of the illumination light is expressed by the timing waveform varying over a constant period. However, note that since the variation in the luminance in one cycle of this period is not recognized and averaged (temporally integrated) by human eyes, the variation in the luminance seems to be still, as shown by a recognizable signal indicated by a dashed line in Part (C) of FIG. 9. For this reason, even if spatial luminance non-uniformity basically occurs in the illumination light, the illumination non-uniformity is not recognized to move, that is, recognized to be still.

On the other hand, as shown in Parts (A) and (B) of FIG. 10, if the vibration frequency f0 slightly differs from (is substantially the same as) the light emitting frequency f1 (vibration frequency f0≈light emitting frequency f1), the luminance of the illumination light (or the optical image on the screen 30) is, for example, as shown in Part (C) of FIG. 10. Specifically, a recognizable signal (indicated by a dashed line in Part (C) of FIG. 10), which results from the temporal average, is not a constant value as described above, but is expressed by, for example, a sinusoidal waveform of a low frequency. This movement at a low frequency (the generation of the above beat phenomenon) may be recognizable. For this reason, if spatial luminance non-uniformity basically occurs in the illumination light, the movement of the luminance non-uniformity in the illumination light may be recognized as blinking.

In addition to using the prism array in order to reduce the generation of the interference patterns instead of using a diffuser plate, the above-described luminance non-uniformity is generated due to the following cause. As shown in FIG. 11, for example, if a far field pattern (FFP) of the laser light beam is not perfectly circular (isotropic) (elliptic, in this case), the luminance distribution of the illumination light may be spatially non-uniform, thereby being likely to cause the luminance non-uniformity. Specifically, the luminance non-uniformity in the illumination light may not be reduced (or the luminance distribution may not be made uniform), depending on the function of the fly eye lens 17. To address this, a technology may be contemplated in which an anamorphotic lens (or a lens having an aerotropic curvature) is provided. However, in this case, the cost for structural members is prone to increase.

(Detailed Principle of Generating Luminance Non-Uniformity)

A description will be given below in detail, of a principle of generating the above-described luminance non-uniformity, with reference to FIGS. 12A to 13B.

First, a function specifying the light and dark patterns (blinking) of a light emitting frequency f1 is defined by "$F_L(t)$". In addition, a lighting state (a state where a laser light beam is being emitted, in this case) is "1", and a dark state (a state where a laser light beam is not emitted, in this case) is "0". In this case, assuming the duty ratio between these lighting and dark states is 50%, when the blinking of the light is regarded as a vibration of a rectangular wave, the above function $F_L(t)$ is subjected to the Fourier expansion, and thus, given by the following expression (A). Meanwhile, assuming a period during which the luminance varies in response to the vibration (vibration frequency $f_0$) of the optical element 14 is proportional to a period during which the optical element 14 vibrates, if a function of specifying the light and dark levels upon luminance variation is defined by "$F_0(t)$", the function $F_0(t)$ is given by the following expression (B).

[Expression 1]

$$\begin{cases} F_L(t) = \frac{1}{2}\left\{1 + \sin(2\pi f_1 t) + \frac{1}{3}\sin(2\pi \cdot 3f_1 t) + \frac{1}{5}\sin(2\pi \cdot 5f_1 t)\right\} & (A) \\ F_0(t) = \frac{1}{2}\{1 + \sin(2\pi f_0 t)\} & (B) \end{cases}$$

The function $F_A(t)$ that restricts the total variation in the luminance of the illumination light emitted from the illumination device 1, which is caused due to a relationship between the light emitting frequency f1 and the vibration frequency f0, is given by multiplying the function $F_L(t)$ by the function $F_0(t)$. Thus, this function $F_A(t)$ is given by the following expression (C).

[Expression 2]

$$\begin{aligned} F_A(t) &= F_L(t) \times F_0(t) \qquad (C) \\ &= \frac{1}{4}\{1 + \sin(2\pi f_0 t)\} \cdot \\ &\quad \left\{1 + \sin(2\pi f_1 t) + \frac{1}{3}\sin(2\pi \cdot 3f_1 t) + \frac{1}{5}\sin(2\pi \cdot 5f_1 t) \ldots\right\} \\ &= \frac{1}{4}\left\{1 + \sin(2\pi f_1 t) + \frac{1}{3}\sin(2\pi \cdot 3f_1 t) + \frac{1}{5}\sin(2\pi \cdot 5f_1 t) \ldots\right\} + \\ &\quad \frac{1}{4}\sin(2\pi f_0 t) + \\ &\quad \frac{1}{4}\sin(2\pi f_0 t)\left\{\sin(2\pi f_1 t) + \frac{1}{3}\sin(2\pi \cdot 3f_1 t) + \right. \\ &\quad \left. \frac{1}{5}\sin(2\pi \cdot 5f_1 t) \ldots\right\} \\ &= \frac{1}{4}\left\{1 + \sin(2\pi f_1 t) + \frac{1}{3}\sin(2\pi \cdot 3f_1 t) + \frac{1}{5}\sin(2\pi \cdot 5f_1 t) \ldots\right\} + \\ &\quad \frac{1}{4}\sin(2\pi f_0 t) - \frac{1}{8}\{\cos(2\pi(f_0 + f_1)t) - \cos(2\pi(f_0 + f_1)t) + \\ &\quad \frac{1}{3}\cos(2\pi(f_0 + 3f_1)t) - \frac{1}{3}\cos(2\pi(f_0 - 3f_1)t) + \\ &\quad \frac{1}{5}\cos(2\pi(f_0 + 5f_1)t) - \frac{1}{5}\cos(2\pi(f_0 - 5f_1)t) \ldots\} \end{aligned}$$

As is clear from the above expression (C), frequencies constituting the function $F_A(t)$ include a frequency {f0±(2X−1)×f1}, in addition to frequency components that basically exist in the function $F_L(t)$ and the function $F_0(t)$ (frequency f0, (2X−1)×f1)(X: arbitrary natural number). In this case, the frequency components constituting the function $F_A(t)$ are defined by being separated into the following three frequency groups (first constituent frequency 1 (No. 1), first constituent frequency 2 (No. 2), and second constituent frequency).

first constituent frequency 1 . . . f0
first constituent frequency 2 . . . {(2X−1)×f1}
second constituent frequency . . . {f0±(2X−1)×f1}

As shown in FIGS. 12A and 12B, for example, frequencies (beat frequencies) which may cause the above beat phenomenon is defined by the sum (sum-frequency) or difference (difference-frequency) of the constituent frequencies. In this case, X' is an arbitrary integer of 0 or greater, and is basically equivalent to X. However, X' is reset, in consideration of the possibility that 0 is contained as the result of the sum or difference, the result of the sum or difference, or terms of even and odd numbers. In FIGS. 12A and 12B, black portions (having a hatch pattern of a dark color (frequencies 2Xf1, ±2X'f1, and ±2(X−1)×f1) do not contain a component of the vibration frequency f0. This means that these portions are not related to the determination of the vibration frequency f0 as described hereinafter. Accordingly, among the beat frequencies shown in FIGS. 12A and 12B, ones containing the component of the vibration frequency f0 (related to determine the vibration frequency f0) are classified into the following three frequencies. Note that "2(X−1), −2(X−1), ±2(X−1), and ±2X" in FIGS. 12A and 12B are expressed collectively as an arbitrary integer X".

f0 . . . first constituent frequency 1
(2f0+X"f1) . . . white portions ("beat frequency B")
(f0+X"f1) . . . gray portions (hatch portion of a faint color) ("beat frequency C")

Specifically, for example, when the vibration frequency f0 is 90 Hz and the light emitting frequency f1 is 60 Hz, frequencies (constituent component frequencies) constituting the function $F_A(t)$ are as shown in FIG. 13A. Meanwhile, for example, when the vibration frequency f0 is 92 Hz and the light emitting frequency f1 is 60 Hz, constituent component frequencies in the function $F_A(t)$ are as shown in FIG. 13B. If all the constituent component frequencies are equal to/more than 20 Hz (preferably, 50 Hz) or are equal to/less than 3 Hz (preferably, 0.5 Hz), human eyes do not perceive (or recognize) the beat phenomenon (the blinking of luminance or the variation therein), as will be described hereinafter. Note that in each of FIGS. 13A and 13B, a frequency region that causes easily a perceptible beat phenomenon (perception inhibition region: a frequency region of more than 3 Hz to less than 20 Hz) is expressed by a region surrounded by diagonal lines. Referring to the example of FIG. 13A (when f0=90 Hz, and f1=60 Hz), since there are no constituent component frequencies within the perception inhibition region, it is understandable that the recognition of the beat phenomenon (beat phenomena B and C corresponding to the beat frequencies B and C, respectively, etc.) be avoided. Meanwhile, referring to the example of FIG. 13B (when f0=92 Hz, and f1=60 Hz), since there is a constituent component frequency (part of the beat frequency B (4 Hz, in this case)) within the perception inhibit region, it is understandable that the beat phenomenon (phenomenon B, in this case) be easily recognized.

The above frequency "20 Hz" is specified on the assumption that a distribution having 1% of the luminance thereon is generated when an image having luminance of 50 lumens and a width of 25 inches is projected in the temporal contrast sensitivity function (refer to "The Temporal Responsiveness of Vision" written by Hart. Jr W. M., etc.). This condition corresponds to 7 troland (pupil diameter $\phi$=3 mm, perfect diffusion assumption). Assuming the width (50 mm) of the luminance distribution is about 10% of a display image in an X axis direction, human eyes do not recognize a frequency of equal to/more than 20 Hz. Thus, the frequency "20 Hz" is an upper limit which a human perceives under the worst environment. Further, it is generally known that the temporal contrast sensitivity function is attenuated greatly at about 50 Hz. In consideration of this fact, the scanning frequency in CRTs and the like is set to 60 Hz. Accordingly, it is preferable that the lower limit of the frequency be set to "50 Hz" under a typical environment. However, an actual condition is so severe in many cases that the frequency in-use range is narrowed.

The above frequency "3 Hz" means that a beat phenomenon occurs once in about 0.33 seconds, and a beat phenomenon occurring at such a frequency may not be recognized easily, unless the same image is displayed in a long time. In this case, however, even if the frequency is slightly shifted, the beat phenomenon is made easier to recognize. Therefore, it is preferable that the synchronizing of the vibration frequency f0 and the light emitting frequency f1, as will be described hereinafter, be tuned precisely. In this case, the frequency "3 Hz" corresponds to one at which the response of human eyes is low in the above temporal contrast sensitivity function. Furthermore, when the frequency is set to "0.5 Hz" instead of "3 Hz", the beat phenomenon is generated once in two seconds. In this case, the beat phenomenon is hardly recognized, independently of the conditions. This fact has been confirmed experimentally, and it can be said that this condition produces the more prominent effect.

(Condition of Decreasing Luminance Non-Uniformity)

In consideration of the principle of generating the luminance non-uniformity (beat phenomenon) as described above, the illumination device 1 of this embodiment is configured to satisfy the following predetermined conditions, in order to reduce the generation of luminance non-uniformity (make the beat phenomenon less recognizable). Specifically, any of the above first constituent frequency 1 (f0) and beat frequencies B and C is set to equal to or less than 3 Hz, or is set to equal to or more than 20 Hz.

When the light emitting frequency is denoted by "f1" [Hz], the variation frequency of the illumination light emitted from the optical element 14, which is generated due to the vibration (driving) of the optical element 14, is denoted by "f2" [Hz], "n1" is an arbitrary integer of 0 to 10 both inclusive, and each of "n2" and "n3" is a predetermined integer of 0 to 10 both inclusive, the illumination device 1 is configured to satisfy the following conditional expressions. In more detail, the illumination device 1 is configured to satisfy the expression (1) or (2) (condition 1: condition of the beat phenomenon B), the expression (3) or (4) (condition 2: condition of the first constituent frequency 1, and the expression (5) or (6) (condition 3: condition of the beat phenomenon C). In this case, either of the expressions (1), (3), and (5) (20 Hz or more) and the expressions (2), (4), and (6) (3 Hz or less) may be satisfied. Note that in this embodiment, the above variation frequency f2 is equal to the vibration frequency f0, and the expressions (1) to (6) are specified by the variation frequency f2. In addition, as to the beat frequencies B and C, the expressions (1), (2), (5), and (6) are rewritten under the condition that X" is equal to or less than zero. This is because only the positive components of the frequency f2 are observed as the calculation result.

$$|2 \times f2 - n1 \times f1| \geq 20 \qquad (1)$$

$$|2 \times f2 - n2 \times f1| \leq 3 \qquad (2)$$

$$f2 \geq 20 \qquad (3)$$

$$f2 \leq 3 \qquad (4)$$

$$|f2 - n1 \times f1| \geq 20 \qquad (5)$$

$$|f2 - n3 \times f1| \leq 3 \qquad (6)$$

Consequently, in this embodiment, a beat phenomenon that occurs in relation to the combination of the light emitting frequency f1 and the variation frequency f2 (vibration frequency f0) of the luminance in the illumination light due to the vibration of the optical element 14, as described above, are difficult (for human eyes) to recognize. In fact, however, only great beat frequency components in the frequencies shown in the tables of FIGS. 12A and 12B have strong influence. Accordingly, beat phenomena among multiple frequencies are present in a combined fashion, rather than an occurrence of a beat phenomenon between two frequencies. Further, since the above expressions (1) to (6) consider a case where two arbitrary frequencies among the frequencies shown in FIGS. 12A and 12B interfere with each other, the behaviors determined by the expressions are somewhat different when multiple frequencies are combined. In such a case, the allowable frequency range determined by the conditions 1 to 3 intends to be somewhat wider. However, the central frequency to be avoided is identical, and in particular, it is preferable that the central frequency be tuned to in the vicinity of the vibration frequency f0 such that the condition 1 is satisfied.

In view of the harmonic components (harmonic frequencies) of the light emitting frequency f1 (fundamental frequency), the following consideration will be given. As shown in FIGS. 2, 9 and 10, for example, if the laser light beam has a rectangular pulse shape, since the signal levels of each harmonic component is proportional to 1/(order n of harmonics), it is generally sufficient to consider harmonics of about n equal to/less than 10. Therefore, under the condition that $0 \le n1 \le 10$ (n1 is an arbitrary integer of 0 to 10 both inclusive), the illumination device 1 is set to satisfy the expressions (1) and (5). Note that when n is 0, the laser light beam is continuously being emitted. Thus, it is preferable that harmonics of $1 \le n \le 10$ be considered. In other words, especially under the condition that $1 \le n1 \le 10$ (n1 is an arbitrary integer of 1 to 10 both inclusive), the illumination device 1 is set to satisfy the expressions (1) and (5). As to the vibration frequency f0 (variation frequency f2), only a primary frequency having the maximum amplitude component (fundamental frequency) may be considered (or any harmonic components may not be considered).

For example, when the light emitting frequency f1 is 60 Hz, the vibration frequency f0 (equal to the variation frequency f2) may be set to within frequency ranges shown in FIGS. 14A to 14C (or frequency ranges that enable beat phenomena to be prevented). FIG. 14A shows an example of ranges of the vibration frequency f0 which enable the beat phenomenon B to be prevented, as to the condition 1. FIG. 14B shows an example of ranges of the vibration frequency f0 which enable the beat phenomenon C to be prevented, as to the condition 3. FIG. 14C shows an example of ranges of the vibration frequency f0 (the product set range of the respective ranges of FIGS. 14A and 14B which enable all the above beat phenomena to be prevented), as to the conditions 1 to 3. The above condition 2 is included in the conditions 1 and 3.

As is clear from FIG. 14A and the expression (1), a preventable vibration frequency f0 as to a condition (condition 1-1) that satisfies the expression (1) in the condition 1 includes 0 Hz to 1.5 Hz, 28.5 Hz to 31.5 Hz, 58.5 Hz to 61.5 Hz, 88.5 Hz to 91.5 Hz, 118.5 Hz to 121.5 Hz, 148.5 Hz to 151.5 Hz, and so on.

As is clear from FIG. 14A and the expression (2), a preventable vibration frequency f0 as to a condition (condition 1-2) that satisfies the expression (2) in the condition 1 includes 10 Hz to 20 Hz, 40 Hz to 50 Hz, 70 Hz to 80 Hz, 100 Hz to 110 Hz, 130 Hz to 140 Hz, and so on.

As is clear from FIG. 14B and the expression (5), a preventable vibration frequency f0 as to a condition (condition 3-1) that satisfies the expression (5) in the condition 3 includes 0 Hz to 3 Hz, 57 Hz to 63 Hz, 117 Hz to 123 Hz, 177 Hz to 183 Hz, and so on.

As is clear from FIG. 14B and the expression (6), a preventable vibration frequency f0 as to a condition (condition 3-2) that satisfies the expression (6) in the condition 3 includes 20 Hz to 40 Hz, 80 Hz to 100 Hz, 140 Hz to 160 Hz, and so on.

The preventable vibration frequency f0 as to a condition (condition 2-1) that satisfies the expression (5) in the condition 2 and the condition (condition 2-2) that satisfies the expression (6) in the condition 2 includes 0 Hz to 3 Hz, and 20 Hz or more.

In consideration of the above, a vibration frequency f0, as shown in FIG. 14C, that satisfies all the above conditions 1-1 to 3-2 includes 0 Hz to 1.5 Hz, 28.5 Hz to 31.5 Hz, 58.5 Hz to 61.5 Hz, 88.5 Hz to 91.5 Hz, 118.5 Hz to 121.5 Hz, 148.5 Hz to 151.5 Hz, and so on.

On the other hand, for example, when the light emitting frequency f1 is 120 Hz, the vibration frequency f0 (equal to the variation frequency f2) may be set to within the frequency ranges (frequency ranges that enable beat phenomenon to be prevented) shown in FIGS. 15A to 15C. FIG. 15A shows an example of ranges of the vibration frequency f0 which enables the beat phenomenon B to be prevented, as to the condition 1.

FIG. 15B shows an example of ranges of the vibration frequency f0 which enables the beat phenomenon C to be prevented, as to the condition 3. FIG. 15C shows an example of ranges of the vibration frequency f0 (the product set range of the respective ranges of FIGS. 15A and 15B) which enables all the above beat phenomena 1 to 3 to be prevented, as to the conditions 1 to 3. The above condition 2 is also included in the conditions 1 and 3.

In this embodiment, as described above, it is preferable that any of the first constituent frequency 1 (f0) and the beat frequencies B and C be set to equal to or less than 0.5 Hz, or be set to equal to or more than 50 Hz. In other words, it is preferable that the following expression (8) or (9), expression (10) or (11), and expression (12) or (13) be satisfied. In this case, likewise, any of the expressions (8), (10), and (12) (50 Hz or more) and the expressions (9), (11), and (13) (0.5 Hz or less) may be satisfied. Note that the variation frequency f2 is also equal to the vibration frequency f0, and the following expressions (8) to (13) are also specified by the variation frequency f2.

$$|2 \times f2 - n1 \times f1| \ge 50 \tag{8}$$

$$|2 \times f2 - n2 \times f1| \le 0.5 \tag{9}$$

$$f2 \ge 50 \tag{10}$$

$$f2 \le 0.5 \tag{11}$$

$$|f2 - n1 \times f1| \ge 50 \tag{12}$$

$$|f2 - n3 \times f1| \le 0.5 \tag{13}$$

When the illumination device 1 is set to satisfy the above expressions, the beat phenomenon, which occurs due to the relationship between the variation frequency f2 (vibration frequency f0) and the light emitting frequency f1, is further made less recognizable (to further difficult for human eyes to recognize). In this case, the region of the vibration frequency f0 which satisfies the condition 2 (expression (10) or (11)) is narrowed. When a projector that emits illumination light of considerably high luminance (for example, 10 lm or more) is necessary, it is more preferable that the projector satisfy the above expressions (8) to (13). An actual experiment has confirmed that satisfying these conditions is more preferable.

In terms of suppressing the generation of the luminance non-uniformity, the light emitting frequency f1 and the variation frequency f2 (vibration frequency f0) of the luminance may satisfy the above-described relationships. However, in terms of reducing the generation of the interference patterns, it is preferable that the variation frequency f2 of the luminance be considerably greater. It this case, it is more preferable that the variation frequency f2 of the luminance be set to satisfy the expression (3) ($f2 \ge 20$) than the expression (4) ($f2 \le 3$). In addition, it is further more preferable that the variation frequency f2 of the luminance be set to satisfy the expression (10) ($f2 \ge 50$).

When the expressions (1), (3), and (5) are satisfied (or when the expressions (8), (10), and (12) are satisfied), it is preferable that the illumination device 1 of this embodiment further satisfy the following condition. Specifically, it is preferable that the amplitude of the luminance non-uniformity in the illumination light (the amplitude of the vibration) when the prism array 14 vibrates be greater than the magnitude (range) of the luminance non-uniformity in the illumination light when the prism array 14 stops vibrating. In other words, it is preferable that a range where the luminance non-uniformity in the illumination light moves on the screen 30 when the prism array 14 vibrates be wider than a range of the luminance non-uniformity in the illumination light. This is because a region where decreased luminance non-uniformity regions constantly overlap on the screen 30 tends to become a constant luminance non-uniformity region (or a region where the luminance non-uniformity is not reduced), for example, as shown in FIG. 16. This means that the spatial variation frequency of the illumination light on the screen 30 when the prism array 14 vibrates is higher than the spatial frequency of the luminance non-uniformity. Assuming that the spatial frequencies of the luminance distribution in the illumination light when the prism array 14 stops vibrating (or stops being driven) are defined by "f31", . . . , "f3M" (M: integer of 2 or more) in increasing order of a frequency, and that the spatial amplitude of the luminance distribution in the illumination light when prism array 14 is vibrating (or is driven) is defined by "A0", it is more preferable that the following expression (7) be further satisfied. Note that the reason why f31 is eliminated is that generally the central region in the illumination light is brighter and the perimeter region therein is darker. Therefore, since having a component of a great magnitude, f31 is not recognized easily by human eyes.

$$(1/f32) \leq A0 \qquad (7)$$

When the light source section emits laser light beams of different wavelengths (red, green, and blue laser light beams, in this case) as in this embodiment, it is preferable that a laser light beam of the following wavelength satisfy the expression (1) or (2), the expression (3) or (4), and the expression (5) or (6). Specifically, it is preferable that the light emitting frequency f1 of the laser light beam, the wavelength of which at least corresponds to the color having the highest luminosity factor among the different wavelengths, satisfy the expression (1) or (2), the expression (3) or (4), and the expression (5) or (6). In addition, the respective light emitting frequencies f1 of the laser light beams, the wavelengths of which correspond to two or more colors having relatively high luminosity factors among the different wavelengths, may satisfy the expression (1) or (2), the expression (3) or (4), and the expression (5) or (6). Furthermore, it is the most preferable that the light emitting frequencies f1 of all the laser light beams of the different wavelengths satisfy the expression (1) or (2), the expression (3) or (4), and the expression (5) or (6). Alternatively, the expression (8) or (9), the expression (10) or (11), and the expression (12) or (13) may be satisfied, instead of the expression (1) or (2), the expression (3) or (4), and the expression (5) or (6). The same may apply to the other cases.

Concretely, first, when the light source section emits a red laser light beam (R), a green laser light beam (G), and a blue laser light beam (B) of three different wavelengths as in this embodiment, it is preferable that the light emitting frequency f1g of the green laser light beam (G) which corresponds to the color (green) having the highest luminosity factors satisfy the expression (1) or (2), the expression (3) or (4), and the expression (5) or (6). In addition, for example, when the light source section emits the R, G, B, and a yellow laser light beam (Y) of four different wavelengths, or when the light source section emits the R, G, B, and a white laser light beam (W) of four different wavelengths, it is preferable that, for example, the respective light emitting frequency f1g, f1y, and f1w of the laser light beams G, Y, and W satisfy the expression (1) or (2), the expression (3) or (4), and the expression (5) or (6). Furthermore, for example, any of a case where the light source section emits laser light beams R, G, and B of three different wavelengths, a case where the light source section emits laser light beams R, G, B, and Y of four different wavelengths, and a case where the light source section emits laser light beams R, G, B, and W of four different wavelengths, it is the most preferable that the light emitting frequency f1 of all the laser light beams satisfy the expression (1) or (2), the expression (3) or (4), and the expression (5) or (6). Note that the above description has been given as to the case where the laser light beams of various colors have the same light emitting frequency f1. However, this description applies to a case where one or more of the laser light beams have different light emitting frequencies f1 from the other or others, for example, as in a case where laser light beams are emitted periodically in order of R, G, B, G, and so on. Moreover, for example, when the laser light beams R, G, and B of three different wavelengths are used, if a period where the laser light beam R is emitted and a period where the laser light beam G is emitted partially differ from each other, the respective light emitting frequencies f1 of the laser light beams may be considered individually.

In the above-described embodiment, the optical element (prism array) 14 through which the laser light beams (red, green, and blue lasers) emitted from the laser light sources (the red laser 11R, the green laser 11G, and the blue laser 11B) pass vibrates. In addition, the expression (1) or (2), the expression (3) or (4), and the expression (5) or (6) are satisfied. This makes it possible to reduce the generation of the interference patterns generated due to the laser light beam, and to obscure the beat phenomenon which occurs in relation to the combination of the light emitting frequency f1 and the variation frequency f2 (vibration frequency f0) of the luminance in the illumination light. Consequently, it is possible to suppress the luminance non-uniformity (or improve the display image quality) while reducing the generation of the interference patterns.

Furthermore, in order to reduce the generation of the interference patterns, the prism array 14 is used, instead of a diffuser plate as in the comparative example. This makes it possible to minimize or prevent the loss of the laser light beam, thereby improving the utilization efficiency of the light (or decreasing the electrical power consumption).

Moreover, even if the FFP of the laser light beam is anisotropic, the vibration of the prism array 14 obscures the luminance non-uniformity which occurs due to light having such an anisotropic FFP. This makes it possible to improve the display image quality without involving an additional member such as an anamorphotic lens, thus avoiding the increase in the costs devoted to the members.

The technique which this embodiment employs (as well as modification examples described below) is effective when applied to image devices other than image modulation devices that scan the laser light beam (illumination light)) (or so-called "image modulation devices of a beam scanning type"). This is because the spatial coherence of the laser light beam is maintained in a display device of a beam scanning type. Accordingly, unless another technique is employed, it is difficult to sufficiently reduce the interference patterns. In addition, the frequency characteristic and advantageous effect in the technique employed in this embodiment and the like greatly differ from those of image modulation devices of a beam scanning type, in taking the measures against the generation of the interference patterns, as well as reducing the luminance non-uniformity.

MODIFICATION EXAMPLES

Next, modification examples (modification examples 1 to 7) of the above-described embodiment will be described below. Note that the same reference numerals will be assigned to the same components as those in the embodiment, and the description thereof will be omitted as appropriate.

Modification Example 1

The above embodiment assumes the case where an emitted light waveform (rectangular wave) formed by the laser light beam rises steeply, and only high frequency waveforms, the frequencies of which are an odd multiple of that of the emitted light waveform, are generated, as shown in Parts (A) and (C) of FIG. 17. In many cases, however, the emitted light waveform formed by the laser light beam may be rounded at its rising edges, due to the response speed of liquid crystal and the like, for example, as shown in Parts (B) and (D) of FIG. 17. Moreover, in the embodiment, the emitted light waveform generated by each of the laser light sources 11R, 11G, and 11B is set to have a duty ratio of 50%, for example, as shown in Parts (A) and (B) of FIG. 17. In fact, however, it is more common that the emitted light waveform generated by each of the laser light sources 11R, 11G, and 11B be set to have a duty ratio of 33%, for example, as shown in Parts (C) and (D) of FIG. 17.

When the emitted light waveform formed by the laser light beam is rounded or the duty ratio of the emitted light waveform is not 50% as described above, frequencies that are an odd multiple of the fundamental frequency (or even-numbered, higher-order frequency components) are also included in the above expressions (1) to (6) and (8) to (13). In more detail, in this case, the term "2X" is simply changed into "X" in the constituent component frequency in the expressions (1) to (6) and (8) to (13). For example, the beat frequencies shown in FIGS. 12A and 12B are changed into those shown in FIGS. 18A and 18B.

FIGS. 18A and 18B indicate totally the same compositions as those of constituent component frequencies and the beat frequencies when the duty ratio of the emitted light waveform is 50% and the even-numbered, higher-order frequency components are not contained. Accordingly, it is possible for even this modification example to produce the same effect as the embodiment, as long as satisfying the conditional expressions given in the embodiment. Actually, since the magnitudes of the components in this modification example differ from those in the embodiment, the frequency ranges tend to be narrower than when the duty ratio is 50%. The narrowest frequency ranges are considered to one specified by the conditions 1 to 3.

Modification Example 2

If the light emitting frequency f1 contains multiple frequency components (a combination of frequency components), a product set for all the conditions is used which is obtained from the result (a range of the vibration frequency f0) of performing a calculation so as to satisfy the conditional expressions described in the embodiment. However, if frequency components having a multiple relationship, such as frequencies f1 of 60 Hz and f1 of 120 Hz are contained, the high harmonics for the frequency of 120 Hz are already considered upon consideration of the frequency of 60 Hz. Therefore, the result of lower multiple frequencies is applicable.

Modification Example 3

Up to this point, the description has been given, under the condition that the vibration frequency f0 of the optical element 14 is assumed to be equal to the variation frequency f2 of the luminance in the illumination light (the variation frequency of the luminance in the illumination light which is generated by the vibration of the optical element 14). In fact, however, the vibration frequency f0 often differs from the variation frequency f2. For example, as shown in Parts (A) and (B) of FIG. 19, if the optical element 14 is composed of a cylindrical lens array in one dimensional form, and the vibration amplitude of the optical element 14 corresponds to the twice of the frequency thereof, the blinking frequency (or the variation frequency f2) of the luminance distribution which is generated for one vibration cycle of the optical element 14 corresponds to the four times of the vibration frequency f0 (f2=4×f0).

Basically, the vibration frequency f0 indicates the blinking frequency of the luminance distribution. Accordingly, in this case, the following substitution is made to the conditional expressions (expression (1) to (6) and (8) to (13)) given in the above embodiment. Specifically, this modification example is applied to an example in which a relationship between the vibration frequency f0 and the variation frequency f2 of the luminance in the illumination light is considered as described above, and satisfies the following expression (14). In this case, N represents a ratio of (the vibration amplitude of the optical element 14) to (the pitch of structural units of the optical element 14 in the vibration direction). For example, assuming the optical element 14 is composed of the prism array shown in FIG. 4, a pitch of a structural unit corresponds to the pitch d of the prism 140.

$$f2=(2\times N\times f0) \tag{14}$$

Concretely, the conditional expressions in the above embodiment (expressions (1) to (6) and (8) to (13)) may be substituted by the following expressions (15) to (20) and (21) to (26), respectively, by using the expression (14).

$$|4N\times f0-n1\times f1|\geq 20 \tag{15}$$

$$|4N\times f0-n2\times f1|\leq 3 \tag{16}$$

$$2N\times f0\geq 20 \tag{17}$$

$$2N\times f0\leq 3 \tag{18}$$

$$|2N\times f0-n1\times f1|\geq 20 \tag{19}$$

$$|2N\times f0-n3\times f1|\leq 3 \tag{20}$$

$$|4N\times f0-n1\times f1|\geq 50 \tag{21}$$

$$|4N\times f0-n2\times f1|\leq 0.5 \tag{22}$$

$$2N\times f0\geq 50 \tag{23}$$

$$2N\times f0\leq 0.5 \tag{24}$$

$$|2N\times f0-n1\times f1|\geq 50 \tag{25}$$

$$|2N\times f0-n3\times f1|\leq 0.5 \tag{26}$$

Therefore, this modification example may satisfy the expression (15) or (16), (17) or (18), and (19) or (20). In addition, it is more preferable that this modification example satisfy the expression (21) or (22), (23) or (24), and (25) or (26).

However, a concern about which frequency component (blinking frequency component) is primary still remains. For example, even in the above case, the blinking of the luminance distribution contains a component of a frequency that is the four times of the vibration frequency f0, as a main component, but further contains a component of a frequency that is the same as the vibration frequency f0. Accordingly, in consideration of a case where a combination of the frequencies described in the above modification example 2 are contained, the above conditional expressions are calculated for f0 and 4f0, and the product set obtained from these calculation results is the most appropriate.

FIGS. 20 and 21 are respective graphs obtained by rewriting the graphs of FIGS. 14A to 14C and FIGS. 15A to 15C (the range of the vibration frequency f0 which enables the beat phenomenon to be prevented), in consideration of the above description (a relationship between the vibration frequency f0 and the variation frequency f2).

As shown in FIG. 20, for example, in a projector that emits sufficiently bright light at f1 of 60 Hz, the maximum luminosity factor is 50 Hz. Accordingly, it can be said that the vibration under the condition that f0 is in the vicinity of 60 Hz or 120 Hz be the most appropriate. In addition, setting f0 and N to 90 Hz and 2, respectively, is also an excellent technique.

Even if N is set to 2, the actual vibration may sometimes be generated at N of about 1.8, due to the temperature change and the like. Therefore, it is preferable that a preventable frequency be set at N=1 and N=2. In that sense, setting f0 to 60 Hz or 120 Hz is the most preferable. However, an experiment has proved that the effect of decreasing the beat phenomenon is significant, even at the maximum luminosity factor of 30 Hz. Therefore, 90 Hz is considered to be a preferable value as a second candidate for f0.

Meanwhile, for example, when the vibration frequency f0 is 110 Hz, it is considered that human eyes do not recognize the beat phenomenon easily at N=2, but may recognize the beat phenomenon at N=1. Accordingly, the vibration frequency f0 of 110 Hz is inappropriate in the terms of redundancy. Furthermore, although applying commonly to the cases of N=1 and N=2, when the projector emits bright light at f0=100 Hz, the beat phenomenon is difficult to decrease at the maximum luminosity factor of 20 Hz. In addition, the beat phenomenon is decreased only at f0=100 Hz, thus failing to ensure the redundancy for a variation in the frequency.

Setting the vibration frequency f0 to 90 Hz provides a certain level of durability for the variation in N. In that sense, this value is considered to significantly ensure the redundancy. In addition, even when N is set to 1 for the sake of decreasing the current in terms of power saving, it is considered that the beat phenomenon is not recognized easily under the condition that f0 is in the vicinity of 60 Hz, 90 Hz, or 120 Hz. Therefore, these frequencies are considered to be optimal values. In this case, the allowable frequency variation range is wider than when N is set to 2. Therefore, for example, it is more preferable that N be set to 1 under the condition to be installed in a vehicle where a temperature greatly changes and N is likely to be varied.

A graph shown in FIG. 21 indicates a preventable frequency f0 when the light emitting frequency f1 is 120 Hz. The allowable frequency range of this preventable frequency is wider than that of 60 Hz. Accordingly, it is more preferable that the light emitting frequency f1 is set to 120 Hz if possible.

This modification example has been described by giving an example in which the optical element 14 is composed of a cylindrical lens array in one dimensional form as shown in Part (C) of FIG. 19. However, the structure of the optical element 14 is not limited thereto, and may be any structure as long as multiple structural units are arranged in the vibration direction. In this case, note that exceptionally the above condition where N is equal to a ratio of (the vibration amplitude of the optical element 14) to (the pitch of structural units of the optical element 14 in the vibration direction) may not be established, when a special illumination technique, for example, overlaying illumination images with mirrors and the like, is employed.

Modification Example 4

FIG. 22 shows a whole structure of a display device (display device 3A) according to modification example 4. This display device 3A of the modification example is provided with an illumination device 1A (described hereinafter) in the display device 3 of the above embodiment, instead of the illumination device 1. The other structure is the same.

The illumination device 1A is provided further with a control section 19 in the illumination device 1 of the above embodiment, and the other structure is the same.

The control section 19 dynamically (and continuously) controls the vibration frequency f0 and the light emitting frequency f1 (or the light emitting frequencies f1r, f1g, and f1b), so as to satisfy the expression (1) or (2), (3) or (4), and (5) or (6). Alternatively, the control section 19 may control both frequencies, so as to satisfy the expression (8) or (9), (10) or (11), and (12) or (13), instead of the expression (1) or (2), (3) or (4), and (5) or (6). In addition, the control section 19 may control the frequencies, so as to satisfy the expression (15) or (16), (17) or (18), and (19) or (20). Furthermore, the control section 19 may control the frequencies, so as to satisfy the expression (21) or (22), (23) or (24), and (25) or (26).

By providing the above control section 19, the modification example produces the same effect as the above embodiment, as well as makes it possible to make the beat phenomenon much less recognizable (or set the frequencies more precisely), thereby improving the display image quality.

Modification Example 5

FIG. 23 shows a structure (partial structure) of main part of an illumination device (illumination device 1B) according to modification example 5. This illumination device 1B of the modification example is a concrete example of the "optical element" according to an embodiment of the present disclosure. The illumination device 1B is provided with a diffraction element 14B (described hereinafter) in the illumination device 1, instead of the prism array 14 in the above-described embodiment and modification example 1. The other structure thereof is the same as that of the illumination device 1.

As shown in FIG. 23, the diffraction element 14B is an optical element that diffracts an incident light beam, and emits the diffracted light beam toward the collimator lens 16 and the fly eye lens 17.

In this modification example, the driver section 15 displaces a relative position between the diffraction element 14B and the fly eye lens 17, thereby changing one or both of the incident position and incident angle of the laser light beam on the incident surface of the fly eye lens 17. Specifically, the driver section 15 (slightly) vibrates the diffraction element 14B on an optical axis (optical axis Z0) of both the diffraction element 14B and the fly eye lens 17 (or in a Z axis direction), thereby displacing the relative position.

In this way, the diffraction element 14B subjects the incident light beam to the diffraction effect (or emits the diffracted light beam), while being vibrated on the optical axis thereof by the driver section 15. As a result, beam scanning is carried out, similar to the embodiment. Specifically, the light beam emitted from the diffraction element 14B performs the beam scanning for the incident surface of the fly eye lens 17. This multi-overlaying (temporal averaging) of speckle patterns reduces the generation of speckle noises (interference patterns) generated due to the laser light beam, similar to the above embodiment.

Even in this modification example, the driver section 15 also displaces the relative position between the diffraction element 14B and the fly eye lens 17 (or vibrates the diffraction element 14B itself, in this case), so as to change one or both of the incident position and the incident angle of the laser light beams on the incident surface of the fly eye lens 17. Accordingly, even in this modification example, it is also possible to attenuate or prevent the loss of the light beam which is to enter the fly eye lens 17 from the diffraction element 14B due to the displacement of the above relative position (or the beam scanning), similar to the above embodiment.

As shown in FIG. 23, the light beam diffracted by the diffraction element 14B contains a m-th light beam (m-th diffracted light beam), and respective heights (lengths on the Y axis) of this m-th light beam at locations of the collimator lens 16 and the fly eye lens 17 are denoted by "H" and "T". In addition, a diffraction angle of the m-th light beam is denoted by "$\theta m$", a distance between the diffraction element 14B and the collimator lens 16 is denoted by "Z1", a distance between the collimator lens 16 and the fly eye lens 17 is denoted by "D", and a synthesized focal length (not shown) of the collimator lens 16 is denoted by "f". In this case, the following expression (27) is given. Thus, when a vibration amplitude of the diffraction element 14B is denoted by "$\Delta L$", a variation amount $\Delta T$ of the height T on the fly eye lens 17 is given by the following expression (28). Accordingly, in this modification example, the amplitude $\Delta L$ upon vibration may be set, so as to allow the variation amount $\Delta T$ to fall within a range that is effective to decrease the speckle noises. Furthermore, when a pitch of a diffraction grating in the diffraction element 14B is denoted by "p", and a wavelength of the incident light ray is denoted by "$\lambda$", the diffraction angle $\theta m$ is given by the following expression (29). Therefore, in this modification example, when a beam shift amount that is effective to decrease the speckle noises on the fly eye lens 17 is denoted by "S", this beam shift amount S satisfies the following conditional expression (expression (30)).

[Expression 3]

$$\begin{cases} T = \left(Z + D \times \dfrac{L}{f}\right) \tan\theta_m & (27) \\ \Delta T = \left(D \times \dfrac{\tan\theta_m}{f}\right) \Delta L & (28) \\ \theta_m = \sin^{-1}\left(\dfrac{m\lambda}{p}\right) & (29) \\ D \times \dfrac{\tan\theta_m}{f} \Delta L \geq S & (30) \end{cases}$$

The illumination device 1B configured above and the display device equipped with this illumination device 1B behave in the same manner as those in the above-described embodiment do, thereby making it possible to produce the same effect. This achieves the compactness and the efficient utilization of the light, as well as the reduction in the generation of the interference patterns (or the improvement of the display image quality).

This modification example has been described as to the case where the diffraction element 14B is provided as one concrete example of the "optical element" according to an embodiment of the present disclosure, but this modification example is not limited thereto. Specifically, a prism array, a diffraction element, a lens, or a lens array may be used as an example of the "optical element". In addition, a diffusing element may also be used in some situations.

Even in this modification example, the control section 19 may also be provided to perform the dynamic frequency control, similar to the above modification example 1.

Modification Example 6

Structure of Display Device 3C

FIG. 24 shows a whole structure of a display device (display device 3C) according to modification example 6. The display device 3C of this modification example is provided with an illumination device 1C (described hereinafter) and a pair of projection lens 23a and 23b in the display device 3 of the above embodiment, instead of the illumination device 1 and the single projection lens 23, respectively. The other structure is the same.

The illumination device 1C is provided with an optical element (liquid crystal element) 14C and a driver section 15C therefor in the illumination device 1 of the above embodiment, instead of the optical element (prism array) 14 and the driver section 15 therefor. The other structure is the same.

The liquid crystal element 14C is an element (electro-optical element) in which, for example, a liquid crystal layer is interposed and sealed between a pair of transparent substrates. By applying a voltage (drive voltage V0 (described hereinafter)) between electrodes (transparent electrodes) formed on the respective transparent substrates, a polarization state and the like of a light beam that has entered in the liquid crystal element 14C is changed. In this modification example, the liquid crystal element 14C is disposed on an optical path between the pair of projection lens 23a and 23b (concretely, near the pupils of the lenses or a conjugate point of the pupils).

In this modification example, the liquid crystal element 14C has multiple unit cells (polarized unit regions) 141 having a rectangular shape, which are arranged on the light incident surface (Y-Z plane) in two-dimensional (matrix) form, for example, as shown in FIG. 25. The individual unit cells 141 are configured to be driven independently of one another. When the drive voltage V0 is applied to the unit cells 141 individually, the liquid crystal element 14C creates a distribution of the various polarized orientations P3 (polarized components) for the incident laser light beam, for example, as shown in FIG. 25.

The driver section 15C applies the above drive voltage V0 to the liquid crystal element 14C, thereby driving the liquid crystal element 14C at a predetermined drive frequency. As a result, the liquid crystal element 14C changes the coherency (one or more of the position, angle, polarization, and phase, in this case) of the incident laser light beam. In this modification example, particularly, the driver section 15C electrically vibrates the liquid crystal element 14C at the drive frequency (vibration frequency f0), thereby changing one or more of the polarization and phase of the laser light beam. Note that a detailed way by which the driver section 15C drives the liquid crystal element 14C will be described hereinafter.

(Behavior and Effect of Display Device 3C)

In the above display device 3C, the illumination device 1C emits illumination light, similar to the illumination device 1. This illumination light is selectively reflected by the polarization beam splitter 22, and the reflected illumination light is incident to the reflective liquid crystal element 21. Then, the incident light is reflected by the reflective liquid crystal element 21 while being modulated on the basis of an image signal, and the reflected, modulated light travels as an optical image. Following this, the optical image emitted from the reflective liquid crystal element 21 selectively passes through the polarization beam splitter 22. The optical image that has passed through the polarization beam splitter 22 passes through the projection lens 23a, the liquid crystal element 14C, and the projection lens 23b in this order. Finally, the optical image is (magnified) and projected onto the screen 30.

Upon projection, the unit cells 141 of the liquid crystal element 14C overlay respective laser light beams of polarized orientations P3 (polarization components) onto the whole surface of the screen 30, for example, as shown in FIG. 26. In the example of FIG. 26, a laser light beam of a polarized orientation P3y (parallel to the Y axis) which has been emitted from one of the unit cells 141, and a laser light beam of a polarized orientation P3z (parallel to the Z axis) which has been emitted from another one of the unit cells 141 are overlaid on the whole surface of the screen 30. Note that the effect produced by overlaying light beams of various polarized components becomes more significant, as the liquid crystal element 14C is disposed closer to the pupils of the projection lens 23a and 23b or the conjugate point of the pupils.

Furthermore, as shown in FIG. 27, the driver section 15C applies a drive voltage V0 of a predetermined drive frequency f0 to the unit cells 141 of the liquid crystal element 14C, in order to electrically (and slightly) vibrate the liquid crystal element 14C. Consequently, the individual polarized states (or the angles of linear polarization, etc.) of the laser light beams emitted from the unit cells 141 are changed in time series, so that various polarized light components are overlaid on the screen 30 in time series. This produces an effect appearing as if the coherency of the laser light beam is decreased, thus making it possible to reduce the generation of the speckle noises (interference patterns) generated due to the laser light beam, similar to the above embodiment and the like.

However, as in the above embodiment, the above method of reducing the interference patterns by using the liquid crystal element 14C may also cause the luminance (irradiated) non-uniformity of the illumination light in some cases, for example, as shown in FIG. 28. This may be a factor in lowering the display image quality.

The reason why the use of a liquid crystal element causes the luminance non-uniformity is, for example, as follows. Generally, an intensity of a light beam emitted from a liquid crystal element is dependent on an orientation angle of the liquid crystal. Thus, the luminance non-uniformity seems to be generated on the screen. This is not a concern in three-chip projectors, etc. when the drive frequency f0 is set to a high frequency of an unrecognized level for human eyes (for example, 30 Hz or more). However, if the field sequential method is employed as a color combining method as in this modification example, the beat phenomenon as described in the above embodiment may occur. In addition, the cause of generating the luminance non-uniformity is not limited to the above-mentioned angle dependence. For example, the luminance non-uniformity may be generated, if the size of each unit cell of the liquid crystal element is too large and therefore the luminance non-uniformity is generated therein, or if the response delay, etc. occur in the liquid crystal element.

Therefore, in order to reduce the generation of the luminance non-uniformity (or make the beat phenomenon less recognizable), even the display device 3C of this modification example is also set to satisfy the predetermined conditional expressions (expressions (1) to (6), etc.) given in the above embodiment and the like. Specifically, the display device 3C is set to satisfy the expressions (1) or (2), (3) or (4), and (5) or (6).

Consequently, this modification example also obscures the beat phenomenon (or make the beat phenomenon less recognizable for human eyes) occurring in relation to a combination of the light emitting frequency f1 and the variation frequency f2 (vibration frequency f0) of the luminance in the illumination light which is caused by the driving (electrical vibration) of the liquid crystal element 14C. This enables this modification example to behave in the same manner as the above-described embodiment does, thereby producing the same effect. Thus, it is possible to suppress the luminance non-uniformity (improve the display image quality) while reducing the generation of the interference patterns.

In this modification example, the liquid crystal element 14C is disposed near the pupils or the conjugate point of the pupils of the projection lens 23a and 23b. This decreases the influence of the liquid crystal element 14C on the projected image, thereby making it possible to enhance the effect produced by overlaying the polarized light beams at a maximum. Note that the position of the liquid crystal element 14C is not limited to the above-described one. Alternatively, the liquid crystal element 14C may be disposed at a different position. However, if the display device has an element that separates an optical path in accordance with the polarized orientation of incident light, such as the reflective liquid crystal element 21, the position of the liquid crystal element 14C may be limited to that closer to the projected position than the polarization beam splitter 22 (or on the side of the screen 30 with respect to the polarization beam splitter 22).

Note that the distribution of the polarized orientations P3 (or the distribution of the polarized components) in the unit cells 141 of the liquid crystal element 14C which FIG. 25 illustrates are merely one example. Alternatively, the polarized components may create a different distribution. However, the liquid crystal element 14C may decrease the coherence level of the laser light beam more effectively, as the respective polarized states of the unit cells 141 are more random. In addition, in a method of driving (applying the drive voltage V0 to) the unit cells 141, different vibration frequencies, instead of the common (single) drive frequency f0, may be applied. In this case, it is preferable that all the vibration frequencies satisfy the above conditional expressions.

Moreover, the liquid crystal element 14C may not be provided with the multiple cells (unit cells 141) to which the drive voltage V0 is to be applied, as opposed to that shown in FIG. 26. Alternatively, the liquid crystal element 14C may be provided with multiple independent polarized regions. Specifically, just like the liquid crystal element 14C shown in FIG. 29, for example, a single cell 142 may be provided on a light incident surface (or on a Y-Z plane), and multiple independent polarized regions (five polarized regions 142a to 142e, in this case) may be formed in the single cell 142. Specifically, when the drive voltage V0 is applied to a voltage applied point Pv at the central portion of the single cell 142, a distribution of the differently polarized orientations P3 for the incident laser light beam (the distribution of concentrically polarized components, in this case) is created on the polarized regions 142a to 142e in the single cell 142. Advantageously, the liquid crystal element 14C configured above (having the single cell 142) overlays multiple polarized light beams at lower cost than the liquid crystal element 14C configured as shown in FIG. 25 (having the multiple independent unit cells 141) does. However, the more polarized orientations or phases of the light beams are overlaid, the more significant the effect of reducing the speckle noises is. In view of this, the liquid crystal element 14C configured as shown in FIG. 25 is more preferable.

The description of this modification example has been given mainly as to the case where the optical element is driven to change the polarized orientations of the laser light beams. However, this modification example is not limited thereto. For example, the optical element may be driven to change the phases of the laser light beams, as described above. The optical element (electro-optical element) as described above may be formed by using, for example, a transparent solid-state phase-modulation material, such as PLZT (a material of composition based on, for example, $Pb_{0.814}La_{0.213}$ $(Ti_{0.6}Zr_{0.4})O_3$), lithium niobate ($LiNbO_3$), $LiTaO_3$, KTP, and KDP ($KHH_2PO_4$). In addition, an acoustooptic element formed by containing a material of, for example, tellurium dioxide ($T_eO_2$), lead molybdate ($PbMoO_4$), and the like may be used to change (modulate) one or both of the phase and angle of each laser light beam. Even in this case, it is more preferable that multiple independent unit cells be provided in the acoustooptic element, in order to further enhance the effect of reducing the speckle noises.

The liquid crystal element 14C may be driven by combining the driving method described in this modification example (electrical vibration) and the mechanical driving method described in the above embodiment and the like (mechanical vibration). In more detail, the liquid crystal element 14C may be vibrated electrically by applying the drive voltage V0 thereto while mechanical vibration is applied to the liquid crystal element 14C. Employing the combination of the driving method as described above enables the further reduction in the speckle noises. In this case, as to setting of the frequency for the sake of reducing the luminance non-uniformity, it is preferable that one or both of the drive frequencies for the electrical vibration and the mechanical vibration (vibration frequency f0) may be set to satisfy the above conditional expressions. Note that if both of the drive frequencies are set to satisfy the above conditional expressions, it is possible to further reduce the luminance non-uniformity.

Moreover, in the modification example, two or more of the techniques that have been described so far (in the embodiment and the modification examples 1 to 5) may be combined.

Modification Example 7

In the above-described examples (the embodiment and the modification examples 1 to 6), the description has been given as to the case where a primary frequency having the maximum amplitude component is employed as the variation frequency f2 of the luminance in the illumination light. Meanwhile, in this modification example, a description will be given in a case where the frequency of the luminance non-uniformity of the illumination light does not contain such a primary frequency, for example, just like a frequency of white noise.

FIGS. 30A and 30B show an example of a characteristic of white noise Nw. Specifically, FIG. 30A shows an example in which the level (voltage) of the white noise Nw changes with time, and FIG. 30B shows an example in which the level of the white noise Nw changes with frequencies.

The white noise Nw is one of noises which are expressed by a random waveform (changing with time), for example, as shown in FIG. 30A, and does not contain any frequency that can be said as the primary frequency, for example, as shown in FIG. 30B. In this example, the level of the noise does not depend on frequencies, and has a constant value that is independent of frequencies.

In this case, an arbitrary frequency (any given one of all the frequencies) may be used as the variation frequency f2 of the luminance in the illumination light, and may be substituted into the above conditional expressions. Specifically, even in this case, the conditional expressions are certainly satisfied at any of the frequencies. Therefore, the beat phenomenon is decreased to some extent. Thus, even when the white noise Nw and the like are considered as in this modification example, it is possible to produce the same effect by employing the above-described technique.

Other Modification Examples

Up to this point, a technique according to an embodiment of the present disclosure has been described by giving the embodiment and the modification examples. However, a technique according to an embodiment of the present disclosure is not limited thereto, and various modifications and variations are possible.

For example, although in the embodiment and the like, the prism array, the diffraction element, the lens, the lens array, the liquid crystal element, etc. have been described as an example of the "optical element" according to an embodiment of the present disclosure, any other optical element may be used. Likewise, any optical member other than the fly eye lens described in the embodiment and the like (for example, a rod integrator) may be used as the "optical member" according to an embodiment of the present disclosure.

Although the embodiment and the like have been described as to the case where the laser light sources emit laser light beams intermittently at a predetermined frequency f1 in order to emit laser light beams intermittently from the light source section at the predetermined frequency f1, a technique according to an embodiment of the present disclosure is not limited thereto. For example, the laser light beams emitted from the laser light sources may be blocked by any given technique, or an acousto-optic element, an element utilizing an electro-optic effect, or some other element may be used, in order to emit laser light beams intermittently from the light source section at the predetermined frequency f1.

Although the embodiment and the like have been described as to the case where each of the light sources (red, green, and blue light sources) is a laser light source, a technique according to an embodiment of the present disclosure is not limited thereto. The multiple light sources may be any other light sources, as long as one or more of the light sources is a laser light source. In other words, a combination of a laser light source and other light sources (for example, LEDs, etc.) or a combination of laser light sources and another light source may be provided in the light source section.

Although the embodiment and the like have been described as to the case where the light modulation element is of a reflective type, a technique according to an embodiment of the present disclosure is not limited thereto. For example, the light modulation element may be of a light-transmitting type. In addition, the light modulation element may be any element other than a liquid crystal element (for example, a digital micromirror device (DMD), etc.). If a DMD is used as the light modulation element, the limitation to restrict the position of the optical element (liquid crystal element, etc.), namely, the limitation in which the optical element is disposed closer to the projected position than the polarization beam splitter 22 as described in the above modification example 7 is eliminated.

Although the embodiment and the like have been described as to the case where the three light sources of different wavelengths are used, a technique according to an embodiment of the present disclosure is not limited thereto. For example, one, two, four, or more light sources may be used instead of the three light sources.

In the above embodiment and the like, the individual components (of the optical system) in the illumination devices and the display devices have been described specifically. However, all of the components may not be provided, or one or more additional components may be provided. For example, a dichroic mirror may be provided, instead of the dichroic prisms 131 and 132.

The embodiment and the like have been described as to the case where a projection device is equipped with the projection optical system (projection lenses) that projects light modulated by the light modulation element onto the screen, and this projection device is configured as a projection display device. However, a technique according to an embodiment of the present disclosure may be applied such as to direct-view display devices.

Accordingly, it is possible to achieve at least the following configurations from the above-described example embodiments and the modifications of the disclosure.

[1] An illumination device, including:
a light source section including a laser light source, and allowing a laser light beam emitted from the laser light source to be outputted intermittently at a predetermined frequency;
an optical element through which the laser light beam outputted intermittently from the light source section passes; and
a driver section changing a coherency of the laser light beam by driving the optical element at a predetermined drive frequency,
wherein the following expression (1) or (2), expression (3) or (4), and expression (5) or (6) are satisfied:

$$|2 \times f2 - n1 \times f1| \geq 20 \quad (1)$$

$$|2 \times f2 - n2 \times f1| \leq 3 \quad (2)$$

$$f2 \geq 20 \quad (3)$$

$$f2 \leq 3 \quad (4)$$

$$|f2 - n1 \times f1| \geq 20 \quad (5)$$

$$|f2 - n3 \times f1| \leq 3 \quad (6)$$

where f1 denotes the frequency in Hz, f2 denotes a variation frequency of luminance in illumination light outputted from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

[2] The illumination device according to [1], wherein, when the expression (1), (3), or (5) is satisfied, the following expression (7) is further satisfied:

$$(1/f32) \leq A0 \quad (7)$$

where respective spatial frequencies of a luminance distribution of the illumination light when the driving of the optical element is stopped are denoted by f31, . . . , f3M in increasing order, M being an integer of equal to or more than 2, and A0 denotes a spatial amplitude of the luminance distribution of the illumination light when the driving of the optical element is performed.

[3] The illumination device according to [1] or [2], wherein
the light source section allows the laser light beams having a plurality of wavelengths to be outputted, and
the expression (1) or (2), the expression (3) or (4), and the expression (5) or (6) are satisfied for the frequency of the laser light beam having a wavelength, among the plurality of wavelengths, that at least corresponds to a color having a highest luminosity factor.

[4] The illumination device according to [3], wherein the expression (1) or (2), the expression (3) or (4), and the expression (5) or (6) are satisfied for the frequency of each of the laser light beams having respective wavelengths, among the plurality of wavelengths, that at least correspond to two or more colors having higher luminosity factors relatively.

[5] The illumination device according to [4], wherein the expression (1) or (2), the expression (3) or (4), and the expression (5) or (6) are satisfied for the frequency of each of the laser light beams having the plurality of wavelengths.

[6] The illumination device according to any one of [1] to [5], further including a control section dynamically controlling the drive frequency and the frequency to satisfy the expression (1) or (2), the expression (3) or (4), and the expression (5) or (6).

[7] The illumination device according to any one of [1] to [6], wherein the expression (3) is satisfied.

[8] The illumination device according to any one of [1] to [7], wherein the following expression (8) or (9), expression (10) or (11), and expression (12) or (13) are satisfied:

$$|2 \times f2 - n1 \times f1| \geq 50 \quad (8)$$

$$|2 \times f2 - n2 \times f1| \leq 0.5 \quad (9)$$

$$f2 \geq 50 \quad (10)$$

$$f2 \leq 0.5 \quad (11)$$

$$|f2 - n1 \times f1| \geq 50 \quad (12)$$

$$|f2 - n3 \times f1| \leq 0.5 \quad (13)$$

[9] The illumination device according to [8], wherein the expression (10) is satisfied.

[10] The illumination device according to any one of [1] to [9], wherein the laser light source allows the laser light beam to be outputted intermittently at a predetermined light emitting frequency, as the frequency.

[11] The illumination device according to any one of [1] to [10], wherein the driver section changes one or more of a position, an angle, a polarization, and a phase of the laser light beam by driving the optical element.

[12] The illumination device according to [11], wherein the driver section changes one or both of the position and the angle of the laser light beam by mechanically vibrating the optical element at a predetermined vibration frequency, as the drive frequency.

[13] The illumination device according to [12], wherein
the optical element includes a plurality of structural units arranged in a direction of the vibration thereof, and
the following expression is satisfied:

$$f2 = (2 \times N \times f0)$$

where f0 denotes the vibration frequency, and N denotes a ratio of an amplitude of the vibration of the optical element to a pitch of the structural units in the direction of the vibration.

[14] The illumination device according to [11], wherein the driver section changes one or both of the polarization and the phase of the laser light beam by electrically vibrating the optical element at the drive frequency.

[15] The illumination device according to [14], wherein the optical element is a liquid crystal element.

[16] The illumination device according to any one of [1] to [15], wherein the light source section includes three types of light sources emitting light beams of red, green, and blue.

[17] The illumination device according to [16], wherein one or more of the three types of light sources includes the laser light source.

[18] A display device with an illumination device emitting illumination light and a light modulation element modulating the illumination light based on an image signal, the illumination device including:

a light source section including a laser light source, and allowing a laser light beam emitted from the laser light source to be outputted intermittently at a predetermined frequency;

an optical element through which the laser light beam outputted intermittently from the light source section passes; and a driver section changing a coherency of the laser light beam by driving the optical element at a predetermined drive frequency, wherein the following expression (1) or (2), expression (3) or (4), and expression (5) or (6) are satisfied:

$$|2 \times f2 - n1 \times f1| \geq 20 \tag{1}$$

$$|2 \times f2 - n2 \times f1| \leq 3 \tag{2}$$

$$f2 \geq 20 \tag{3}$$

$$f2 \leq 3 \tag{4}$$

$$|f2 - n1 \times f1| \geq 20 \tag{5}$$

$$|f2 - n3 \times f1| \leq 3 \tag{6}$$

where f1 denotes the frequency in Hz, f2 denotes a variation frequency of luminance in illumination light outputted from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

[19] The display device according to [18], further including a projection optical system projecting the illumination light modulated by the light modulation element onto a projected surface.

[20] The display device according to [19], wherein the optical element is disposed near a pupil of the projection optical system, or a conjugate point of the pupil.

The present disclosure contains subject matters related to those disclosed in Japanese Priority Patent Applications JP 2011-154592 and JP 2011-273555 filed in the Japan Patent Office on Jul. 13, 2011 and Dec. 14, 2011, respectively, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illumination device, comprising:
a light source section including a laser light source, and allowing a laser light beam emitted from the laser light source to be output intermittently at a predetermined frequency;
an optical element through which the laser light beam output intermittently from the light source section passes; and
a driver section changing a coherency of the laser light beam by driving the optical element at a predetermined drive frequency,
wherein the following expression (1) or (2), expression (3) or (4), and expression (5) or (6) are satisfied:

$$|2 \times f2 - n1 \times f1| \geq 20 \tag{1}$$

$$|2 \times f2 - n2 \times f1| \leq 3 \tag{2}$$

$$f2 \geq 20 \tag{3}$$

$$f2 \leq 3 \tag{4}$$

$$|f2 - n1 \times f1| \geq 20 \tag{5}$$

$$|f2 - n3 \times f1| \leq 3 \tag{6}$$

where f1 denotes the predetermined frequency in Hz, f2 denotes a variation frequency of luminance in illumination light output from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

2. The illumination device according to claim 1, wherein, when the expression (1), (3), or (5) is satisfied, the following expression (7) is further satisfied:

$$(1/f32) \leq A0 \tag{7}$$

where respective spatial frequencies of a luminance distribution of the illumination light when the driving of the optical element is stopped are denoted by f31, ..., f3M in increasing order, M being an integer of equal to or more than 2, and A0 denotes a spatial amplitude of the luminance distribution of the illumination light when the driving of the optical element is performed.

3. The illumination device according to claim 1, wherein:
the light source section allows the laser light beams having a plurality of wavelengths to be output, and
the expression (1) or (2), the expression (3) or (4), and the expression (5) or (6) are satisfied for the frequency of the laser light beam having a wavelength, among the plurality of wavelengths, that at least corresponds to a color having a highest luminosity factor.

4. The illumination device according to claim 3, wherein the expression (1) or (2), the expression (3) or (4), and the expression (5) or (6) are satisfied for the frequency of each of the laser light beams having respective wavelengths, among the plurality of wavelengths, that at least correspond to two or more colors having higher luminosity factors relatively.

5. The illumination device according to claim 4, wherein the expression (1) or (2), the expression (3) or (4), and the expression (5) or (6) are satisfied for the frequency of each of the laser light beams having the plurality of wavelengths.

6. The illumination device according to claim 1, further comprising a control section dynamically controlling the drive frequency and the frequency to satisfy the expression (1) or (2), the expression (3) or (4), and the expression (5) or (6).

7. The illumination device according to claim 1, wherein the expression (3) is satisfied.

8. The illumination device according to claim 1, wherein the following expression (8) or (9), expression (10) or (11), and expression (12) or (13) are satisfied:

$$|2 \times f2 - n1 \times f1| \geq 50 \qquad (8)$$

$$|2 \times f2 - n2 \times f1| \leq 0.5 \qquad (9)$$

$$f2 \geq 50 \qquad (10)$$

$$f2 \leq 0.5 \qquad (11)$$

$$|f2 - n1 \times f1| \geq 50 \qquad (12)$$

$$|f2 - n3 \times f1| \leq 0.5 \qquad (13).$$

9. The illumination device according to claim 8, wherein the expression (10) is satisfied.

10. The illumination device according to claim 1, wherein the laser light source allows the laser light beam to be output intermittently at the predetermined frequency.

11. The illumination device according to claim 1, wherein the driver section changes one or more of a position, an angle, a polarization, and a phase of the laser light beam by driving the optical element.

12. The illumination device according to claim 11, wherein the driver section changes one or both of the position and the angle of the laser light beam by mechanically vibrating the optical element at a predetermined vibration frequency, as the drive frequency.

13. The illumination device according to claim 12, wherein:
the optical element includes a plurality of structural units arranged in a direction of the vibration thereof, and
the following expression is satisfied:

$$f2 = (2 \times N \times f0)$$

where f0 denotes the vibration frequency, and N denotes a ratio of an amplitude of the vibration of the optical element to a pitch of the structural units in the direction of the vibration.

14. The illumination device according to claim 11, wherein the driver section changes one or both of the polarization and the phase of the laser light beam by electrically vibrating the optical element at the drive frequency.

15. The illumination device according to claim 14, wherein the optical element is a liquid crystal element.

16. The illumination device according to claim 1, wherein the light source section includes three types of light sources emitting light beams of red, green, and blue.

17. The illumination device according to claim 16, wherein one or more of the three types of light sources includes the laser light source.

18. A display device with an illumination device emitting illumination light and a light modulation element modulating the illumination light based on an image signal, the illumination device comprising:
a light source section including a laser light source, and allowing a laser light beam emitted from the laser light source to be output intermittently at a predetermined frequency;
an optical element through which the laser light beam output intermittently from the light source section passes; and
a driver section changing a coherency of the laser light beam by driving the optical element at a predetermined drive frequency,
wherein the following expression (1) or (2), expression (3) or (4), and expression (5) or (6) are satisfied:

$$|2 \times f2 - n1 \times f1| \geq 20 \qquad (1)$$

$$|2 \times f2 - n2 \times f1| \leq 3 \qquad (2)$$

$$f2 \geq 20 \qquad (3)$$

$$f2 \leq 3 \qquad (4)$$

$$|f2 - n1 \times f1| \geq 20 \qquad (5)$$

$$|f2 - n3 \times f1| \leq 3 \qquad (6)$$

where f1 denotes the predetermined frequency in Hz, f2 denotes a variation frequency of luminance in illumination light output from the optical element in Hz, the variation frequency being generated by the driving of the optical element, n1 denotes an arbitrary integer of 0 to 10 both inclusive, and n2 and n3 denote respective predetermined integers of 0 to 10 both inclusive.

19. The display device according to claim 18, further comprising a projection optical system projecting the illumination light modulated by the light modulation element onto a projected surface.

20. The display device according to claim 19, wherein the optical element is disposed near a pupil of the projection optical system, or a conjugate point of the pupil.

* * * * *